United States Patent
Ueki

(10) Patent No.: US 7,394,742 B2
(45) Date of Patent: Jul. 1, 2008

(54) OPTICAL DISC WITH HIGH DISC SCANNING SPEED, AND RELATED APPARATUS AND METHOD FOR USING SUCH OPTICAL DISC

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 165 days.

(21) Appl. No.: 11/395,214

(22) Filed: Apr. 3, 2006

(65) Prior Publication Data
US 2006/0176794 A1    Aug. 10, 2006

Related U.S. Application Data

(62) Division of application No. 10/280,010, filed on Oct. 25, 2002, now Pat. No. 7,102,970.

(30) Foreign Application Priority Data

| Nov. 2, 2001 | (JP) | ............................. 2001-337523 |
| Oct. 4, 2002 | (JP) | ............................. 2002-292942 |

(51) Int. Cl.
*G11B 5/09* (2006.01)
*G11B 7/24* (2006.01)

(52) U.S. Cl. .................. 369/59.11; 369/275.3
(58) Field of Classification Search ........................ None
See application file for complete search history.

(56) References Cited

U.S. PATENT DOCUMENTS

| 5,148,422 | A | * | 9/1992 | Sako et al. ............... 369/44.26 |
| 5,715,355 | A | | 2/1998 | Yonemitsu et al. |
| 5,878,020 | A | | 3/1999 | Takahashi |
| 5,926,453 | A | | 7/1999 | Muramatsu et al. |
| 6,101,158 | A | * | 8/2000 | Hogan ........................ 369/47.3 |
| 6,280,811 | B1 | * | 8/2001 | Nee ........................... 428/64.1 |
| 6,463,185 | B1 | * | 10/2002 | Mori et al. .................. 382/302 |
| 6,504,806 | B1 | | 1/2003 | Nakajo |

(Continued)

FOREIGN PATENT DOCUMENTS

JP       09-282661       10/1997

(Continued)

OTHER PUBLICATIONS

ECMA: Standardizing Information And communication Systems: "120 mm DVD Rewritable Disk (DVD-RAM)" Standard ECMA-272 2$^{nd}$ Ed.-Jun. 1999, XP-002186767.

(Continued)

*Primary Examiner*—Joseph Feild
*Assistant Examiner*—Peter Vincent Agustin
(74) *Attorney, Agent, or Firm*—Louis Woo

(57) ABSTRACT

A laser-beam-scanned optical disc includes an information recording area and an information management area. The information management area stores recording management information having portions corresponding to respective integer multiples of a normal velocity relating to scanning of the disc. Each of the portions of the recording management information contains a first information piece representative of a recording strategy for recording of information on the information recording area and a second information piece representative of a recording laser power for recording of information on the information recording area.

15 Claims, 9 Drawing Sheets

| FIELD ID | RECORDED INFORMATION | POSITION |
|---|---|---|
| ID0 | ECC BLOCK ADDRESS | DATA AREA |
| ID1 | APPLICATION CODE AND OTHER | LEAD-IN AREA |
| ID2 | OPC RECOMMENDED CODE / WRITE STRATEGY CODE 1 (1×) | LEAD-IN AREA |
| ID3 | PRODUCT ID1 | LEAD-IN AREA |
| ID4 | PRODUCT ID2 | LEAD-IN AREA |
| ID5 | WRITE STRATEGY CODE 2 (1×) | LEAD-IN AREA |
| ID6 | OPC RECOMMENDED CODE / WRITE STRATEGY CODE 1 (2×) | LEAD-IN AREA |
| ID7 | WRITE STRATEGY CODE 2 (2×) | LEAD-IN AREA |
| ... | | |
| ... | | |
| IDn | OPC RECOMMENDED CODE / WRITE STRATEGY CODE 1 (m×) | LEAD-IN AREA |
| IDn+1 | WRITE STRATEGY CODE 2 (m×) | LEAD-IN AREA |

U.S. PATENT DOCUMENTS

| | | |
|---|---|---|
| 6,580,684 B2 | 6/2003 | Miyake et al. |
| 6,894,961 B1 | 5/2005 | Osakabe |
| 7,088,667 B2 * | 8/2006 | Kobayashi ............... 369/275.3 |
| 2001/0036138 A1 | 11/2001 | Kawashima et al. |
| 2002/0051416 A1 * | 5/2002 | Suzuki ................... 369/59.12 |

FOREIGN PATENT DOCUMENTS

| | | |
|---|---|---|
| JP | 10-320781 | 12/1998 |
| JP | 2001-148124 | 5/2001 |
| JP | 2001-209940 | 8/2001 |
| JP | 2001-312823 | 11/2001 |
| WO | 97/13244 | 9/1996 |

OTHER PUBLICATIONS

ECMA: Standardizing Information And Communication Systems: "80 mm (1,23 Gbytes per side) and 120 mm (3,95 Gbytes per side) DVD-Recordable Disk (DVD-R)" Standard ECMA-279 Dec. 1998, XP-002183289.

80 mm (1.23 GB/side) and 120 mm (3.95 GB/side) DVD-Recordable Disc (DVD-R), JIS X 6245:1999 (Confirmed 2004), Japanese Standards Association.

Notice of References Cited (Form PTO-948 attached to Nov. 15, 2007 Office Action rendered in co-pending U.S. Appl. No. 11/395,220).

* cited by examiner

FIG. 2

| FIELD ID | RECORDED INFORMATION | POSITION |
|---|---|---|
| ID0 | ECC BLOCK ADDRESS | DATA AREA |
| ID1 | APPLICATION CODE AND OTHER | LEAD-IN AREA |
| ID2 | OPC RECOMMENDED CODE / WRITE STRATEGY CODE 1 | LEAD-IN AREA |
| ID3 | PRODUCT ID1 | LEAD-IN AREA |
| ID4 | PRODUCT ID2 | LEAD-IN AREA |
| ID5 | WRITE STRATEGY CODE 2 | LEAD-IN AREA |

FIG. 3

| FIELD ID | RECORDED INFORMATION | POSITION |
|---|---|---|
| ID0 | ECC BLOCK ADDRESS | DATA AREA |
| ID1 | APPLICATION CODE AND OTHER | LEAD-IN AREA |
| ID2 | OPC RECOMMENDED CODE / WRITE STRATEGY CODE 1 (1x) | LEAD-IN AREA |
| ID3 | PRODUCT ID1 | LEAD-IN AREA |
| ID4 | PRODUCT ID2 | LEAD-IN AREA |
| ID5 | WRITE STRATEGY CODE 2 (1x) | LEAD-IN AREA |
| ID6 | OPC RECOMMENDED CODE / WRITE STRATEGY CODE 1 (2x) | LEAD-IN AREA |
| ID7 | WRITE STRATEGY CODE 2 (2x) | LEAD-IN AREA |
| ... | | |
| ... | | |
| IDn | OPC RECOMMENDED CODE / WRITE STRATEGY CODE 1 (mx) | LEAD-IN AREA |
| IDn+1 | WRITE STRATEGY CODE 2 (mx) | LEAD-IN AREA |

FIG. 4

FIELD ID0

| FRAME | RECORDED INFORMATION | POSITION |
|---|---|---|
| 0-2 | ECC BLOCK ADDRESS | PART A |
| 3-5 | PARITY | |
| 6 | FIELD ID VALUE | PART B |
| 7-9 | ECC BLOCK ADDRESS | |
| 10-12 | RESERVED | |
| 13-15 | PARITY | |

FIG. 5

FIELD ID2

| FRAME | RECORDED INFORMATION | POSITION |
|---|---|---|
| 0-2 | ECC BLOCK ADDRESS | PART A |
| 3-5 | PARITY | |
| 6 | FIELD ID VALUE (2) | PART B |
| 7-8 | OPC RECOMMENDED CODE | |
| 9-12 | WRITE STRATEGY CODE 1 | |
| 13-15 | PARITY | |

FIG. 6

FIELD ID5

| FRAME | RECORDED INFORMATION | POSITION |
|---|---|---|
| 0-2 | ECC BLOCK ADDRESS | PART A |
| 3-5 | PARITY | |
| 6 | FIELD ID VALUE (5) | PART B |
| 7-10 | WRITE STRATEGY CODE 2 | |
| 11-12 | VELOCITY VALUE (1x) | |
| 13-15 | PARITY | |

FIG. 7

FIELD IDn (6)

| FRAME | RECORDED INFORMATION | POSITION |
|---|---|---|
| 0-2 | ECC BLOCK ADDRESS | PART A |
| 3-5 | PARITY | |
| 6 | FIELD ID VALUE | PART B |
| 7-8 | OPC RECOMMENDED CODE | |
| 9-12 | WRITE STRATEGY CODE 1 | |
| 13-15 | PARITY | |

FIG. 8

FIELD IDn+1 (7)

| FRAME | RECORDED INFORMATION | POSITION |
|---|---|---|
| 0-2 | ECC BLOCK ADDRESS | PART A |
| 3-5 | PARITY | |
| 6 | FIELD ID VALUE | PART B |
| 7-10 | WRITE STRATEGY CODE 2 | |
| 11-12 | VELOCITY VALUE (mx) | |
| 13-15 | PARITY | |

FIG. 11

| FIELD ID | RECORDED PLACE | ADDRESS NUMBER |
|---|---|---|
| ID1 | LEAD-IN START POSITION | FFDD05h |
| ID2 | | ... |
| ID3 | | |
| ID4 | | |
| ID5 | | |
| ... | | |
| IDn | | |
| IDn+1 | | |
| ID1 | | |
| ID2 | | |
| ID3 | | |
| ID4 | | |
| ID5 | | |
| ... | | |
| IDn | | |
| IDn+1 | | |
| ... | | |
| NO DATA | READABLE EMBOSS START POSITION | |
| NO DATA | | |
| ... | | |
| NO DATA | | |
| NO DATA | READABLE EMBOSS END POSITION | |
| ... | | |
| ID1 | | |
| ID2 | | |
| ID3 | | |
| ID4 | | |
| ID5 | | |
| ... | | |
| IDn | | |
| IDn+1 | | |
| ID0 | | |
| ... | | |
| ID0 | LEAD-IN END POSITION | ... |
| ID0 | DATA START POSITION | FFD000h |
| ID0 | | FFCFFFh |

FIG. 15

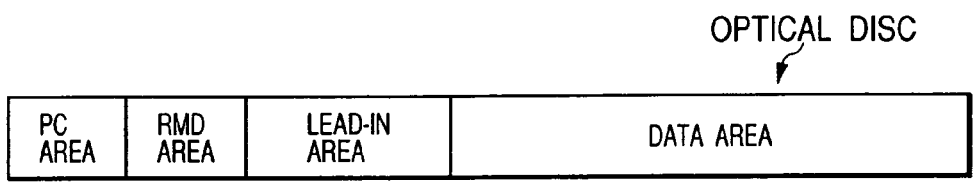

FIG. 16

RMD FIELD 1

| BYTE POSITION | RECORDED INFORMATION | NUMBER OF BYTES |
|---|---|---|
| 0 TO 31 | APPARATUS MANUFACTURE ID | 32 |
| 32 TO 47 | SERIAL NUMBER | 16 |
| 48 TO 63 | MODEL NUMBER | 16 |
| 64 TO 67 | STRATEGY CODE 1 | 4 |
| 68 TO 71 | RECORDING POWER | 4 |
| 72 TO 79 | DATE TIME | 8 |
| 80 TO 83 | RECORDING CALIBRATION POSITION | 4 |
| 84 TO 107 | RUNNING OPC INFORMATION | 24 |
| 108 TO 113 | STRATEGY CODE 2 | 6 |
| 114 TO 115 | ERASING POWER | 2 |
| 116 TO 117 | RECORDING POWER (8-BIT CONVERSION) | 2 |
| 118 TO 119 | RECORD OPTIMIZING INFORMATION | 2 |
| 120 TO 121 | VELOCITY INFORMATION | 2 |
| 122 TO 127 | RESERVED | 6 |

OPTICAL DISC WITH HIGH DISC SCANNING SPEED, AND RELATED APPARATUS AND METHOD FOR USING SUCH OPTICAL DISC

CROSS REFERENCE TO RELATED APPLICATION

This application is a divisional of application Ser. No. 10/280,010 filed Oct. 25, 2002, now U.S. Pat. No. 7,102,970.

BACKGROUND OF THE INVENTION

1. Field of the Invention

This invention relates to an optical disc. In addition, this invention relates to an apparatus for recording and reproducing information on and from an optical disc. Furthermore, this invention relates to a method of recording and reproducing information on and from an optical disc.

2. Description of the Related Art

Optical discs are of a read only type (a playback only type), a recordable type (a write once type), and a rewritable type. A CD (Compact Disc), a VCD (Video CD), and a DVD (Digital Versatile Disc) are optical discs of the read only type. A CD-R and a DVD-R are optical discs of the recordable type. A CD-RW, a DVD-RAM, and a DVD-RW are optical discs of the rewritable type.

Optical discs of the rewritable type have thin recording films which are reversibly changed between two or more different states in accordance with conditions of laser beams applied thereto. Rewritable optical discs include magneto-optical discs and phase change discs.

In the case of a phase change optical disc, while a recording film is scanned by a laser beam, the recording film is reversibly changed between an amorphous state and a crystalline state by varying conditions of the laser beam in response to a signal to be recorded. Thus, the signal is recorded on the recording film as a pattern of amorphous portions and crystalline portions of the recording film. The signal is reproduced from the phase change optical disc as follows. The surface of an amorphous portion of the disc and the surface of a crystalline portion thereof are different in reflectivity with respect to a laser beam. While the phase change optical disc is scanned by a laser beam, a change in reflectivity of the disc surface with respect to the laser beam is optically detected so that the signal is reproduced from the disc.

The phase change optical disc is similar to a read only optical disc and a recordable optical disc in the point that the signal reproduction is implemented by detecting a change in the disc surface reflectivity with respect to a laser beam. The signal overwriting on the phase change optical disc can be performed by use of only one laser beam when the laser power is modulated between an erasing level and a recording level. Therefore, the structure of a drive device for the phase change optical disc can be simple.

A PWM (pulse width modulation) system is used to record a signal on a rewritable optical disc at a high density. According to the PWM system, the positions of the front and rear edges of every recording mark on the disc correspond to "1" in a digital signal.

Conditions of a rewritable optical disc, such as the composition of material for the disc, an additive to the material, and a film thickness in the disc, depend on the maker which has produced the disc. Accordingly, an optimal recording power of a laser beam applied to a rewritable optical disc, an optimal erasing power of the laser beam, a desired width of a front end pulse in a pulse group, a desired width of intermediate multiple pulses in the pulse group, and a desired width of a rear end pulse in the pulse group vary from disc maker to disc maker. In general, information about an optimal recording power, an optimal erasing power of the laser beam, and desired pulse widths which vary from disc maker to disc maker is recorded on each rewritable optical disc as pre-pits.

In the PWM system, the width of every recording mark represents information. Thus, a desirable shape of the recording mark is free from distortion. Specifically, it is desirable that the shapes of the front and rear halves of the recording mark are symmetrical with each other. During the PWM-based recording of a signal on the disc, the disc is exposed to a laser beam while being rotated and moved relative thereto. In addition, the intensity of the laser beam is changed between strong and weak levels in response to the signal to be recorded. Recording marks are formed on portions of the disc which are exposed to and heated by the stronger laser beam. Regarding every recording mark, the heat accumulation effect causes the stronger-beam-application ending point on the disc to be higher in temperature than the stronger-beam-application starting point on the disc. As a result, the rear end of the recording mark is wider than the front end thereof. Thus, the shape of the recording mark is distorted.

A known drive apparatus for a rewritable optical disc records a signal on the disc by use of a laser beam while driving and rotating the disc relative to the laser beam at a constant linear velocity which can be selected from a predetermined normal velocity and a predetermined high velocity. The normal velocity is equal to, for example, 3.49 m/s. The high velocity is equal to, for example, twice or four times the normal velocity.

Since the recording of a signal on a rewritable optical disc by a laser beam is based on heating, recording conditions change in accordance with the velocity (the speed) at which the disc is driven and rotated relative to the laser beam. Accordingly, an optimal recording power of the laser beam, an optimal erasing power of the laser beam, a desired width of a front end pulse in a pulse group, a desired width of intermediate multiple pulses in the pulse group, and a desired width of a rear end pulse in the pulse group depend on the drive speed of the disc relative to the laser beam.

A desired width of a front end pulse in a pulse group, a desired width of intermediate multiple pulses in the pulse group, and a desired width of a rear end pulse in the pulse group are time information referred to as strategy. It is known that information about an optimal recording power of a laser beam, information about an optimal erasing power of the laser beam, and strategy for a normal disc drive speed (a normal disc scanning speed) are recorded on a rewritable optical disc as pre-pits. On the other hand, it is not known to record laser-power information and strategy for a high disc drive speed (a high disc scanning speed) on a rewritable optical disc as pre-pits.

In the case of a rewritable optical disc having pre-pits representing only laser-power information and strategy for a normal disc scanning speed, it takes a long time to find optimal recording conditions for a high disc scanning speed and then start the recording of a signal on the disc under the optimal recording conditions.

U.S. Pat. No. 6,404,713 B1 corresponding to Japanese patent application publication number P2001-209940A discloses a first apparatus for recording and reproducing an information signal on and from an optical disc. The first apparatus includes a memory. The information signal is written into the memory. The information signal is read out from the memory. An optical head generates a laser beam in response to the readout information signal, and applies the laser beam to the optical disc to record the readout information signal on the optical disc. A test signal is recorded on a position of the optical disc near a recording position thereof via the optical head during the writing of the information signal into the memory. The test signal is reproduced from the optical disc. The reproduced test signal is evaluated to generate an evaluation result. An intensity of the laser beam is optimized in response to the evaluation result.

U.S. Pat. No. 6,404,713 B1 also discloses a second apparatus for recording and reproducing an information signal on and from an optical disc. The second apparatus includes a memory. The information signal is written into the memory. The information signal is read out from the memory. An optical head generates a laser beam in response to the readout information signal, and applies the laser beam to the optical disc to record the readout information signal on the optical disc. A power of the laser beam is changed among a plurality of different levels. The laser beam is measured to generate measurement result values during the change of the power of the laser beam among the plurality of the different levels. An intensity of the laser beam is optimized in response to the measurement result values.

SUMMARY OF THE INVENTION

It is a first object of this invention to provide an optical disc which enables a recording apparatus to quickly start the recording of a signal on the disc at a high disc scanning speed.

It is a second object of this invention to provide an apparatus for recording and reproducing information on and from an optical disc which can quickly start the recording of a signal on the disc at a high disc scanning speed.

It is a third object of this invention to provide a method of recording and reproducing information on and from an optical disc which can quickly start the recording of a signal on the disc at a high disc scanning speed.

A first aspect of this invention provides a laser-beam-scanned optical disc including an information recording area and an information management area, the information management area storing recording management information having portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area.

A second aspect of this invention provides a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area.

A third aspect of this invention is based on the first aspect thereof, and provides a laser-beam-scanned optical disc wherein the information management area recurrently stores a whole of the portions of the recording management information which correspond to the integer multiples of the normal velocity respectively.

A fourth aspect of this invention provides a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks recurrently having recording management information including portions corresponding to respective integer multiples of a normal velocity relating to scanning of the disc, wherein each of the recording management information contains a first information piece representative of a recording strategy for recording of information on the information recording area and a second information piece representative of a recording laser power for recording of information on the information recording area, the information management area having a portion unoccupied by blocks among the second blocks and occupied by blocks among the first blocks.

A fifth aspect of this invention provides an apparatus for recording and reproducing information on and from a laser-beam-scanned optical disc including an information recording area and an information management area, the information management area storing recording management information having portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area. The apparatus comprises first means for reading, from the information management area of the disc, one of the portions of the recording management information which corresponds to desired one of the normal velocity and the at least one integer multiple of the normal velocity; second means for setting an actual recording strategy and an actual recording power of a laser beam in accordance with the recording strategy and the recording laser power represented by the portion of the recording management information which is read by the first means; and third means for recording information on the information recording area of the disc by use of the laser beam having the actual recording strategy and the actual recording power set by the second means.

A sixth aspect of this invention provides an apparatus for recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area. The apparatus comprises first means for reading, from the information management area of the disc, one of the portions of the recording management information which corresponds to desired one of the normal velocity and the at least one integer multiple of the normal velocity; second means for setting an actual recording strategy and an actual recording power of a laser beam in accordance with the recording strategy and the recording laser power represented by the portion of the recording management information which is read by the first means; and third means for recording information on the information recording area of the disc by use of the laser beam having the actual recording strategy and the actual recording power set by the second means.

A seventh aspect of this invention provides an apparatus for recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks recurrently having recording management information including portions corresponding to respective integer multiples of a normal velocity relating to scanning of the disc, wherein each of the recording management information contains a first information piece representative of a recording strategy for recording of information on the information recording area and a second information piece representative of a recording laser power for recording of information on the information recording area, the information management area having a portion unoccupied by blocks among the second blocks and occupied by blocks among the first blocks. The apparatus comprises first means for reading, from the information management area of the disc, one of the portions of the recording management information which corresponds to desired one of the normal velocity and the at least one integer multiple of the normal velocity; second means for setting an actual recording strategy and an actual recording power of a laser beam in accordance with the recording strategy and the recording laser power represented by the portion of the recording management information which is read by the first means; and third means for recording information on the information recording area of the disc by use of the laser beam having the actual recording strategy and the actual recording power set by the second means.

An eighth aspect of this invention provides a method of recording and reproducing information on and from a laser-beam-scanned optical disc including an information recording area and an information management area, the information management area storing recording management information having portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area. The method comprises the steps of reading, from the information management area of the disc, one of the portions of the recording management information which corresponds to desired one of the normal velocity and the at least one integer multiple of the normal velocity; setting an actual recording strategy and an actual recording power of a laser beam in accordance with the recording strategy and the recording laser power represented by the portion of the recording management information which is read; and recording information on the information recording area of the disc by use of the laser beam having the actual recording strategy and the actual recording power which are set.

A ninth aspect of this invention provides a method of recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective integer multiples of a normal velocity relating to scanning of the disc, wherein each of the portions of the recording management information contains a first information piece representative of a recording strategy for recording of information on the information recording area and a second information piece representative of a recording laser power for recording of information on the information recording area. The method comprises the steps of reading, from the information management area of the disc, one of the portions of the recording management information which corresponds to desired one of the normal velocity and the at least one integer multiple of the normal velocity; setting an actual recording strategy and an actual recording power of a laser beam in accordance with the recording strategy and the recording laser power represented by the portion of the recording management information which is read; and recording information on the information recording area of the disc by use of the laser beam having the actual recording strategy and the actual recording power which are set.

A tenth aspect of this invention provides a method of recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks recurrently having recording management information including portions corresponding to respective integer multiples of a normal velocity relating to scanning of the disc, wherein each of the recording management information contains a first information piece representative of a recording strategy for recording of information on the information recording area and a second information piece representative of a recording laser power for recording of information on the information recording area, the information management area having a portion unoccupied by blocks among the second blocks and occupied by blocks among the first blocks. The method comprises the steps of reading, from the information management area of the disc, one of the portions of the recording management information which corresponds to desired one of the normal velocity and the at least one integer multiple of the normal velocity; setting an actual recording strategy and an actual recording power of a laser beam in accordance with the recording strategy and the recording laser power represented by the portion of the recording management information which is read; and recording information on the information recording area of the disc by use of the laser beam having the actual recording strategy and the actual recording power which are set.

BRIEF DESCRIPTION OF THE DRAWINGS

FIG. 2 is a diagram of the format of an LPP-information field system for an optical disc designed to be scanned at only a normal linear velocity.

FIG. 3 is a diagram of the format of an LPP-information field system for an optical disc designed to be scanned at a linear velocity selectable from a normal linear velocity and higher linear velocities.

FIG. 4 is a diagram of the details of a field ID0 which is listed in FIG. 2 or FIG. 3.

FIG. 5 is a diagram of the details of a field ID2 which is listed in FIG. 2 or FIG. 3.

FIG. 6 is a diagram of the details of a field ID5 which is listed in FIG. 2 or FIG. 3.

FIG. 7 is a diagram of the details of a field IDn which is listed in FIG. 3.

FIG. 8 is a diagram of the details of a field IDn+1 which is listed in FIG. 3.

FIG. 11 is a diagram of the arrangement of fields ID0, ID1, ID2, . . . , and IDn+1 in the lead-in area and the data area of an optical disc in the first embodiment of this invention.

FIG. 15 is a sectional diagram of an optical disc in a second embodiment of this invention.

FIG. 16 is a diagram of the details of a field "1" of an RMD area in FIG. 15.

DETAILED DESCRIPTION OF THE INVENTION

First Embodiment

According to a first embodiment of this invention, a signal is recorded on and reproduced from an optical disc while the disc is scanned by a recording laser beam or a reproducing laser beam. The scanning of the disc by the laser beam is on a CLV (constant linear velocity) basis. The constant linear velocity relating to the scanning of the disc can be selected from a predetermined normal velocity and at least one predetermined high velocity. The normal velocity is equal to, for example, 3.49 m/s. The high velocity is equal to an integer multiple of the normal velocity. The first embodiment of this invention is designed to correct a recording laser beam into an optimal waveform in accordance with the type of an optical disc and a change in the linear velocity relating to the scanning of the disc.

Figure 1:
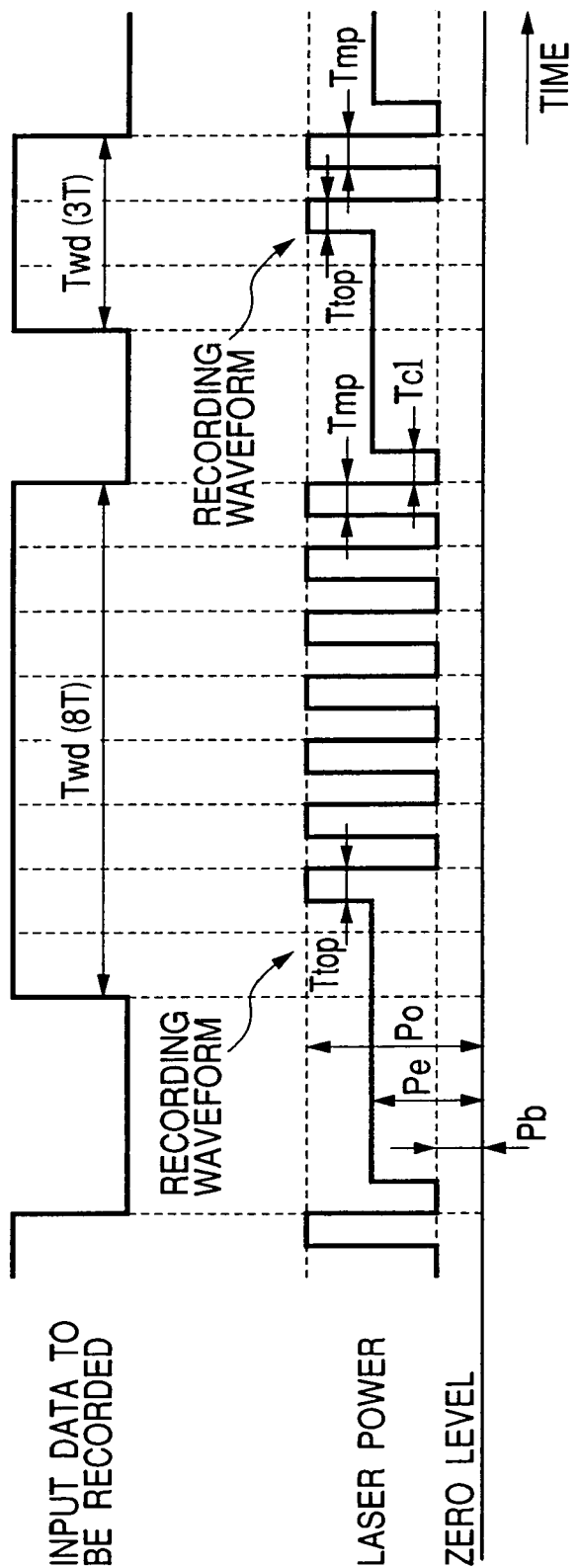
FIG. 1 is a time-domain diagram of a waveform of data to be recorded, and a recording waveform of a laser beam.

As shown in FIG. 1, data to be recorded, that is, 8-16 modulation-resultant input data, repetitively change between a high level state and a low level state. The input data continuously in the high level state correspond to a recording mark on an optical disc. The input data continuously in the low level state correspond to a space between recording marks on the optical disc. A laser beam for writing information on an optical disc (for example, a DVD-RW) is modulated into a recording waveform in accordance with the input data. A clock signal (a bit clock signal) related to the input data has a period T. The period T is also indicated as T. The input data in FIG. 1 have a time-domain portion with a mark length of 8T, and a time-domain portion with a mark length of 3T. According to the laser-beam recording waveform which corresponds to the 8T mark portion or the 3T mark portion of the input data, the power (or the intensity) of the laser beam changes among a recording level Po, an erasing level Pe, and a bias level Pb. The recording level Po is greater than the erasing level Pe. The erasing level Pe is greater than the bias level Pb.

As shown in FIG. 1, for the 8T mark portion or the 3T mark portion of the input data, the power of the laser beam initially remains equal to the erasing level Pe during a certain time length and then rises to the recording level Po to form a first positive-going pulse. Thereafter, the power of the laser beam alternately changes between the recording level Po and the bias level Pb to form a second positive-going pulse or second and later positive-going pulses referred to as multiple positive-going pulses. Preferably, the second and later positive-going pulses have a same width. At the end of the 8T mark portion or the 3T mark portion of the input data, the power of the laser beam drops from the recording level Po to the bias level Pb, and the last positive-going pulse terminates. The last positive-going pulse is followed by a negative-going pulse serving as a cooling pulse. Specifically, after the end of the 8T mark portion or the 3T mark portion of the input data, the power of the laser beam remains equal to the bias level Pb during a certain time length and then rises to the erasing level Pe to form the cooling pulse.

With reference to FIG. 1, during the first T range of the 8T mark portion or the 3T mark portion of the input data, a positive-going pulse is absent. There is one positive-going pulse corresponding to each of the second and later T ranges of the 8T mark portion or the 3T mark portion of the input data. The bias level Pb is equal to a reproducing level in the case of a DVD-RW. A strategy for optimal recording which relates to recording pulse timings is designed to optimally decide the width Ttop of the first positive-going pulse, the width (the duty cycle) Tmp of the second and later positive-going pulses, and the width Tcl of the cooling pulse. For mark portions of the input data which differ from the 8T mark portion and the 3T mark portion, the power of the laser beam is controlled similarly to the previously-mentioned laser-power control for the 8T mark portion and the 3T mark portion.

In the case of a DVD-R (an optical disc), the laser-power-related parameters are modified from those for a DVD-RW. Specifically, the erasing level Pe is changed to the reproducing level (the bias level Pb), and every cooling pulse is removed. The laser-power-related parameters for a DVD-R may be similar to those for a DVD-RW.

In the case of a DVD-RW, the multiple-pulse-like change of the laser-beam power between the recording level Po and the reproducing level (the bias level Pb) may be replaced by a laser-power control profile causing the laser-beam power in an intermediate time range to be lower than those in first and last time ranges for every mark portion of the input data. This design also provides a strategy for optimal recording. The level of the laser-beam power in the intermediate time range is optimally decided. Furthermore, the timing of drop of the laser-beam power for the intermediate time range is optimally decided.

The laser-power-related parameters for a DVD+RW (an optical disc) are similar to those for a DVD-RW. The laser-power-related parameters for a DVD+R (an optical disc) are similar to those for a DVD-R. The laser-power-related parameters for a Blu-ray-standard disc are similar to those for a DVD-RW.

A DVD-R or a DVD-RW has a lead-in area and a data area on which information can be recorded. In general, the lead-in area and the data area correspond to an information management area and an information recording area, respectively. The lead-in area and the data area are formed with an information-recording groove track which wobbles at a constant frequency. When the normal linear velocity relating to the scanning of the disc is equal to 3.49 m/s, the wobble frequency is equal to about 140 kHz. In the lead-in area and the data area, lands between grooves or groove portions have land pre-pits (LPPs) representative of address information and management information. Land pre-pits are disclosed in, for example, Japanese patent application publication number P2001-148124A or P2001-312823A.

A signal recorded on an optical disc such as a DVD-R or a DVD-RW is divided into ECC blocks. One ECC block is a minimum unit of error correction. Also, one ECC block is a minimum unit for the signal reproduction from and the signal recording on the optical disc. Each of units composing the information represented by the LPPs corresponds to one ECC block, and has an information piece representative of an address and other information pieces. The units composing the LPP information are referred to as fields classified by a field type ID (a field type identifier). The field type ID can change among ID0, ID1, ID2, . . . . A field of a type corresponding to a field type IDk is called a field IDk, where IDk=ID0, ID1, ID2, . . . . As will be made clear later, every field is composed of 16 frames.

FIG. 2 shows the format of an LPP-information field system for an optical disc designed to be scanned at only the normal linear velocity. As shown in FIG. 2, there are fields of six types denoted by ID0, ID1, ID2, ID3, ID4, and ID5 respectively. A field ID0 stores an information piece representative of the address of a corresponding ECC block, and other information pieces. Generally, the field ID0 is recorded on a data area of the disc. A field ID1 stores an information piece representative of the address of a corresponding ECC block, an application code, and other information pieces. The field ID1 is recorded on a lead-in area of the disc. A field ID2 stores an information piece representative of the address of a corresponding ECC block, an OPC recommended code/write strategy code "1", and other information pieces. Here, OPC means "optimum power control". The field ID2 is recorded on the lead-in area of the disc. A field ID3 stores an information piece representative of the address of a corresponding ECC block, a production ID "1", and other information pieces. The field ID3 is recorded on the lead-in area of the disc. A field ID4 stores an information piece representative of the address of a corresponding ECC block, a production ID "2", and other information pieces. The field ID4 is recorded on the lead-in area of the disc. A field ID5 stores an information piece representative of the address of a corresponding ECC block, a write strategy code "2", and other information pieces. The field ID5 is recorded on the lead-in area of the disc.

FIG. 3 shows the format of an LPP-information field system for an optical disc designed to be scanned at a linear velocity selectable from the normal linear velocity, a velocity equal to twice the normal linear velocity (the 2-fold linear velocity), . . . , and a linear velocity equal to "m" times the normal linear velocity (the m-fold linear velocity), where "m" denotes a predetermined natural number equal to or greater than 4. For example, the disc scanning linear velocity can be selected from the 1-fold linear velocity (the normal linear velocity), the 2-fold linear velocity, the 4-fold linear velocity, the 6-fold linear velocity, the 8-fold linear velocity, the 12-fold linear velocity, the 16-fold linear velocity, and the 24-fold linear velocity. As shown in FIG. 3, there are fields of different types denoted by ID0, ID1, ID2, . . . , IDn, and IDn+1 respectively. Fields ID0, ID1, ID2, ID3, ID4, and ID5 in FIG. 3 are similar to those in FIG. 2. With reference to FIG. 3, a field ID2 stores an information piece representative of the address of a corresponding ECC block, an OPC recommended code/write strategy code "1" for the scanning of the disc at the normal linear velocity, and other information pieces. A field ID5 stores an information piece representative of the address of a corresponding ECC block, a write strategy code "2" for the scanning of the disc at the normal linear velocity, and other information pieces. A field ID6 stores an information piece representative of the address of a corresponding ECC block, an OPC recommended code/write strategy code "1" for the scanning of the disc at the 2-fold linear velocity, and other information pieces. The field ID6 is recorded on the lead-in area of the disc. A field ID7 stores an information piece representative of the address of a corresponding ECC block, a write strategy code "2" for the scanning of the disc at the 2-fold linear velocity, and other information pieces. The field ID7 is recorded on the lead-in area of the disc. Similarly, a field IDn stores an information piece representative of the address of a corresponding ECC block, an OPC recommended code/write strategy code "1" for the scanning of the disc at the m-fold linear velocity, and other information pieces. The field IDn is recorded on the lead-in area of the disc. A field IDn+1 stores an information piece representative of the address of a corresponding ECC block, a write strategy code "2" for the scanning of the disc at the m-fold linear velocity, and other information pieces. The field IDn+1 is recorded on the lead-in area of the disc.

FIG. 4 shows the details of a field ID0 which is listed in FIG. 2 or FIG. 3. In general, the field ID0 is recorded on the data area of the disc. With reference to FIG. 4, the field ID0 is divided into 16 frames assigned numbers of "0", "1", . . . , and "15" respectively. In the field ID0, the frames having numbers of "0", "1", and "2" store an information piece representative of the address of a corresponding ECC block. The frames having numbers of "3", "4", and "5" store an information piece representative of the parity of the ECC-block-address information piece. The frame having a number of "6" stores an information piece representative of a field ID value (a field identification value). The frames having numbers of "7", "8", and "9" store an information piece representative of the address of the corresponding ECC block. The frames having numbers of "10", "11", and "12" are reserved. The frames having numbers of "13", "14", and "15" store an information piece representative of the parity of the ECC-block-address information piece. Thus, the field ID0 duplicately stores the information piece representative of the address of the corresponding ECC block.

As shown in FIG. 4, the 16 frames of the field ID0 are separated into two groups referred to as a part "A" and a part "B" respectively. The part "A" contains an information piece representative of the address of a corresponding ECC block, and an information piece representative of the parity of the ECC-block-address information piece. The part "B" contains an information piece or information pieces peculiar to the related field. Specifically, the part "A" stores an information piece representative of the address of a corresponding ECC block, and an information piece representative of the parity of the ECC-block-address information piece. The part "B" stores an information piece representative of a field ID value, an information piece representative of the address of the corresponding ECC block, and an information piece representative of the parity of the ECC-block-address information piece.

Similarly, each of fields ID1, ID2, . . . , IDn, and IDn+1 which are listed in FIG. 2 or FIG. 3 is divided into 16 frames assigned numbers of "0", "1", . . . , and "15" respectively. The 16 frames are separated into two groups referred to as a part "A" and a part "B" respectively. The part "A" contains an information piece representative of the address of a corresponding ECC block, and an information piece representative of the parity of the ECC-block-address information piece. The part "B" contains an information piece or information pieces peculiar to the related field.

The part "B" of a field ID1 stores an information piece representative of a field ID value, an application code, and a physical code. The application code has an information piece representative of general use of the disc, and an information piece representative of special use of the disc. The physical code has physical-specification information pieces including an information piece representative of the track pitch of the disc, an information piece representative of the linear velocity relating to the scanning of the disc, an information piece representative of the diameter of the disc, an information piece representative of the recording type (an information piece representative of whether or not the disc is of the phase change type), and an information piece representative of whether the disc is recordable or rewritable. The part "B" of a field ID3 or ID4 stores an information piece representative of a field ID value, and an information piece representative of an identification number (an ID number) of the maker or manufacturer of the disc.

FIG. 5 shows the details of a field ID2 which is listed in FIG. 2 or FIG. 3. In the field ID2, the frames having numbers of "6"-"15" are assigned to the part "B". As shown in FIG. 5, the frame having a number of "6" stores an information piece representative of a field ID value. The frames having numbers of "7" and "8" store an OPC recommended code. The frames having numbers of "9", "10", "11", and "12" store a write strategy code "1". The frames having numbers of "13", "14", and "15" store an information piece representative of the parity of at least one of the information pieces in the part "B". The parity may be omitted. In this case, the frames having numbers of "13", "14", and "15" are set as reserved ones.

The OPC recommended code indicates a recording power level Po and an erasing power level Pe recommended by the disc maker (the disc manufacturer). The OPC recommended code may further indicate a recommended bias power level Pb. The OPC recommended code may indicate the ratio $\epsilon=Pe/Po$, that is, the ratio of the recommended erasing power level Pe to the recommended recording power level Po. The OPC recommended code may further indicate record optimizing information including a recommended asymmetry value or a value $\beta$ representative of the position of a short mark portion relative to a long mark portion of an 8-16 modulation-resultant signal reproduced from the disc to decide recording conditions. The write strategy code "1" has time information pieces representative of recommended pulse widths Ttop, Tmp, and Tcl in the strategy of FIG. 1.

FIG. 6 shows the details of a field ID5 which is listed in FIG. 2 or FIG. 3. In the field ID5, the frames having numbers of "6"-"15" are assigned to the part "B". As shown in FIG. 6, the frame having a number of "6" stores an information piece representative of a field ID value. The frames having numbers of "7", "8", "9", and "10" store a write strategy code "2". The frames having numbers of "11" and "12" store an information piece representative of a desired disc scanning velocity value (1×). The frames having numbers of "13", "14", and "15" store an information piece representative of the parity of at least one of the information pieces in the part "B". The parity may be omitted. In this case, the frames having numbers of "13", "14", and "15" are set as reserved ones. The write strategy code "2" has time information pieces representative of recommended pulse widths Ttop, Tmp, and Tcl in a strategy using a predetermined recording waveform different from that in FIG. 1.

In general, the desired disc scanning velocity value (1×) indicates what times the normal linear velocity the disc can be scanned at.

The desired disc scanning velocity value (1×) is equal to the normal linear velocity relating to the scanning of the disc. When the normal linear velocity is equal to 3.49 m/s, the desired disc scanning velocity value (1×) is a numerical value of "3.49". Alternatively, the desired disc scanning velocity value (1×) may be "1" which is a multiplier for the normal linear velocity. The desired disc scanning velocity value (1×) may be a hexadecimal coded value of "1" (a multiplier) or "3.49".

Preferably, frames in each of the present field (ID5) and later fields which are assigned to desired disc scanning velocity values further store record optimizing information including a recommended asymmetry value or a value $\beta$ representative of the position of a short mark portion relative to a long mark portion of an 8-16 modulation-resultant signal reproduced from the disc to decide recording conditions. The record optimizing information may also be in an OPC recommended code.

As the total number of different linear velocities from which the scanning velocity of an optical disc can be selected increases, the total number of the fields ID2 and ID5 and similar fields increases. The recorded contents of the fields ID2 and ID5 correspond to the normal linear velocity relating to the scanning of the disc. In the case of an optical disc designed to be scanned at only the normal linear velocity, an information piece representative of a desired disc scanning velocity value (1×) may be absent from the field ID5.

As previously mentioned, the fields ID0, ID1, ID2, ID3, ID4, and ID5 in FIG. 3 are similar to those in FIG. 2. The recorded contents of the fields ID2 and ID5 in FIG. 3 correspond to the normal linear velocity relating to the scanning of the disc.

FIG. 7 shows the details of a field IDn which is listed in FIG. 3.

When "n" is equal to "6", the field IDn in FIG. 7 is a field ID6. In the field ID6, the frames having numbers of "6"-"15" are assigned to the part "B". As shown in FIG. 7, the frame having a number of "6" stores an information piece representative of a field ID value. The frames having numbers of "7" and "8" store an OPC recommended code for the 2-fold linear velocity relating to the scanning of the disc. The frames having numbers of "9", "10", "11", and "12" store a write strategy code "1" for the 2-fold linear velocity relating to the scanning of the disc. The frames having numbers of "13", "14", and "15" store an information piece representative of the parity of at least one of the information pieces in the part "B". The parity may be omitted. In this case, the frames having numbers of "13", "14", and "15" are set as reserved ones. The OPC recommended code indicates a recording power level Po and an erasing power level Pe recommended by the disc maker for the 2-fold linear velocity relating to the scanning of the disc. The OPC recommended code may also indicate a recommended bias power level Pb for the 2-fold linear velocity relating to the scanning of the disc. The OPC recommended code may further indicate record optimizing information including a recommended asymmetry value or a value β representative of the position of a short mark portion relative to a long mark portion of an 8-16 modulation-resultant signal reproduced from the disc to decide recording conditions for the 2-fold linear velocity relating to the scanning of the disc. The write strategy code "1" has time information pieces representative of recommended pulse widths Ttop, Tmp, and Tcl in the strategy of FIG. 1 for the 2-fold linear velocity relating to the scanning of the disc.

FIG. 8 shows the details of a field IDn+1 which is listed in FIG. 3. When "n+1" is equal to "7", the field IDn+1 in FIG. 8 is a field ID7.

In the field ID7, the frames having numbers of "6"-"15" are assigned to the part "B". As shown in FIG. 8, the frame having a number of "6" stores an information piece representative of a field ID value. The frames having numbers of "7", "8", "9", and "10" store a write strategy code "2" for the 2-fold linear velocity relating to the scanning of the disc. The frames having numbers of "11" and "12" store an information piece representative of a desired disc scanning velocity value (2×) equal to the 2-fold linear velocity, that is, equal to twice the normal linear velocity relating to the scanning of the disc. The frames having numbers of "13", "14", and "15" store an information piece representative of the parity of at least one of the information pieces in the part "B". The parity may be omitted. In this case, the frames having numbers of "13", "14", and "15" are set as reserved ones. The write strategy code "2" has time information pieces representative of recommended pulse widths Ttop, Tmp, and Tcl in a strategy using a predetermined recording waveform different from that in FIG. 1 for the 2-fold linear velocity relating to the scanning of the disc.

With reference back to FIG. 7, in the field IDn, the frames having numbers of "6"-"15" are assigned to the part "B". As shown in FIG. 7, the frame having a number of "6" stores an information piece representative of a field ID value. The frames having numbers of "7" and "8" store an OPC recommended code for the m-fold linear velocity relating to the scanning of the disc. The frames having numbers of "9", "10", "11", and "12" store a write strategy code "1" for the m-fold linear velocity relating to the scanning of the disc. The frames having numbers of "13", "14", and "15" store an information piece representative of the parity of at least one of the information pieces in the part "B". The parity may be omitted. In this case, the frames having numbers of "13", "14", and "15" are set as reserved ones. The OPC recommended code indicates a recording power level Po and an erasing power level Pe recommended by the disc maker for the m-fold linear velocity relating to the scanning of the disc. The OPC recommended code may also indicate a recommended bias power level Pb for the m-fold linear velocity relating to the scanning of the disc. The OPC recommended code may further indicate record optimizing information including a recommended asymmetry value or a value β representative of the position of a short mark portion relative to a long mark portion of an 8-16 modulation-resultant signal reproduced from the disc to decide recording conditions for the m-fold linear velocity relating to the scanning of the disc. The write strategy code "1" has time information pieces representative of recommended pulse widths Ttop, Tmp, and Tcl in the strategy of FIG. 1 for the m-fold linear velocity relating to the scanning of the disc.

With reference to FIG. 8, in the field IDn+1, the frames having numbers of "6"-"15" are assigned to the part "B". As shown in FIG. 8, the frame having a number of "6" stores an information piece representative of a field ID value. The frames having numbers of "7", "8", "9", and "10" store a write strategy code "2" for the m-fold linear velocity relating to the scanning of the disc. The frames having numbers of "11" and "12" store an information piece representative of a desired disc scanning velocity value (mX) equal to the m-fold linear velocity, that is, equal to "m" times the normal linear velocity relating to the scanning of the disc. The frames having numbers of "13", "14", and "15" store an information piece representative of the parity of at least one of the information pieces in the part "B". The parity may be omitted. In this case, the frames having numbers of "13", "14", and "15" are set as reserved ones. The write strategy code "2" has time information pieces representative of recommended pulse widths Ttop, Tmp, and Tcl in a strategy using a predetermined recording waveform different from that in FIG. 1 for the m-fold linear velocity relating to the scanning of the disc.

In this way, as the total number of different linear velocities from which the scanning velocity of an optical disc can be selected increases by one, the total number of field types increases by two. For an optical disc designed to be scanned at a linear velocity selectable from the normal linear velocity and the 2-fold linear velocity, there are fields ID0 to ID7. For an optical disc designed to be scanned at a linear velocity selectable from the normal linear velocity, the 2-fold linear velocity, and the 4-fold linear velocity, there are fields ID0 to ID9. For an optical disc designed to be scanned at a linear velocity selectable from the normal linear velocity, the 2-fold linear velocity, the 4-fold linear velocity, and the m-fold linear velocity, there are fields ID0 to IDn+1. The total number of ID0 to IDn+1 indicates the total number of different linear velocities from which the scanning velocity of an optical disc can be selected.

Preferably, an application code in the field ID1 includes an extension code representing the total number of different linear velocities from which the scanning velocity of an optical disc can be selected. For an optical disc storing only fields ID0 to ID5, the extension code is set to "0" which represents that the disc can be scanned at only the normal linear velocity. For an optical disc storing only fields ID0 to ID7, the extension code is set to "2" which represents that the disc can be scanned at a linear velocity selectable from the normal linear velocity and the 2-fold linear velocity. Thus, the extension code is set to a value equal to the maximum number following "ID" minus "5". For example, the extension code is set to "n-4" when the maximum number following "ID" is equal to "n+1".

As previously mentioned, the total number of field types denoted by ID0, ID1, ID2, . . . increases in accordance with the total number of different linear velocities from which the scanning velocity of an optical disc can be selected. This design enables a recording and reproducing apparatus to get optimal recording conditions, that is, optimal values about the setting of laser power, for each of the different linear velocities relating to the scanning of the disc.

Figure 9:
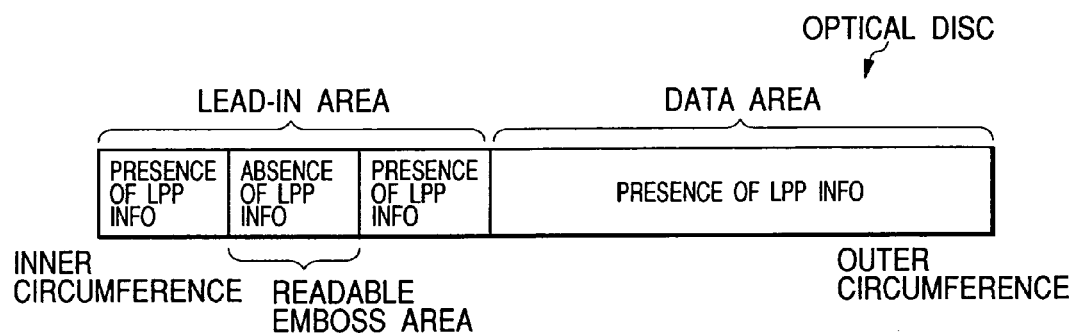
FIG. 9 is a sectional diagram of an optical disc in a first embodiment of this invention.

With reference to FIG. 9, an optical disc (for example, a DVD-RW) includes a lead-in area and a data area. The lead-in area extends in an inner portion of the disc. The data area extends outward of the lead-in area. The lead-in area and the data area form an information management area and an information recording area, respectively. Information for managing the recording and reproduction of data on and from the data area, and also information peculiar to the disc are recorded on the lead-in area. Data (for example, contents data or user data) can be recorded on and reproduced from the data area. In an optical disc which has not yet been subjected to the data recording, LPPs (land pre-pits) representative of an address signal and a management signal, and a wobbling portion representative of a wobble signal are formed along a groove on a 1-ECC-block by 1-ECC-block basis.

The lead-in area of a DVD-RW includes a readable emboss area exclusively for playback. The readable emboss area is formed with emboss pre-pits, and has only wobbling information. LPP information is absent from the readable emboss area. In a DVD-R, a readable emboss area may be replaced with a recordable and readable area. In this case, LPP information exists on the recordable and readable area as LPP information exists on other portions of the lead-in area.

Figure 10:
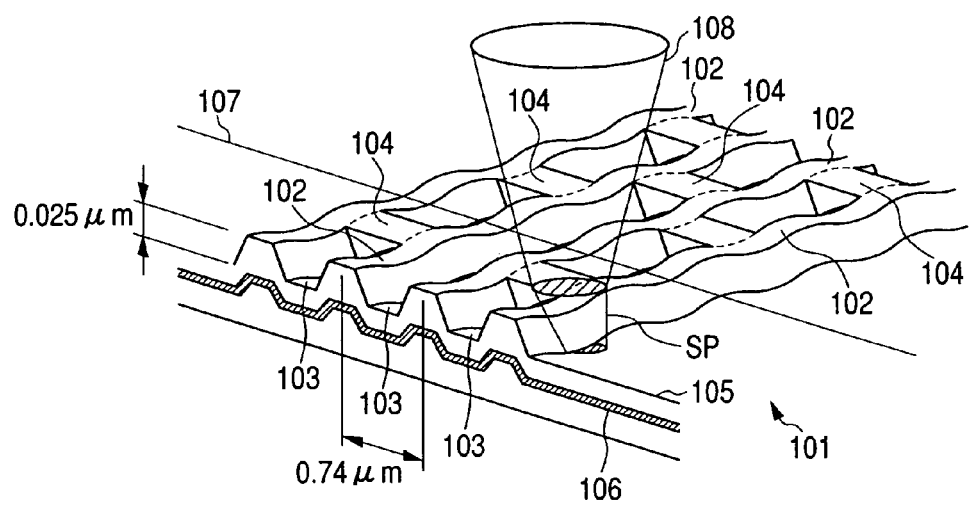
FIG. 10 is a perspective view, partially in section, of a portion of an optical disc in the first embodiment of this invention.

FIG. 10 shows a portion of an optical disc 101 such as a DVD-RW or a DVD-R. The optical disc 101 includes an information recording layer 105 having a phase change film or a pigment film. The optical disc 101 includes a metal-deposited layer (for example, a gold-deposited layer) 106 which extends below the information recording layer 105 as viewed in FIG. 10. The metal-deposited layer 106 acts to reflect a light beam (a laser beam) 108.

The optical disc 101 has an information recording area formed with a spiral of a wobbling groove 102 and a spiral of a land 103. It should be noted that FIG. 10 illustrates the groove 102 and the land 103 in an opposite manner. Specifically, FIG. 10 illustrates the groove 102 and the land 103 as those in a stamper for an optical disc. A portion of the land 103 is located between neighboring portions of the groove 102. A groove portion and a pair of land portions adjoining the groove portion compose a track portion. The groove 102 and the land 103 are coated with a protective film 107. For an easier understanding, groove portions, land portions, and track portions which neighbor in a radial direction of the optical disc 101 are also referred to as grooves, lands, and tracks, respectively.

Alternatively, the optical disc 101 may have a set of concentric circular wobbling grooves 102 and lands 103 formed between neighboring grooves 102.

Main information can be recorded on and reproduced from the groove (or the grooves) 102. First auxiliary information is previously recorded on the optical disc 101 as the wobble of the groove (or the grooves) 102. Second auxiliary information (pre-pit signals or land pre-pit signals) is previously recorded on the land (or the lands) 103. Specifically, the second auxiliary information is represented by land pre-pits (LPPs) 104, that is, pre-pits 104 formed in the land (or the lands) 103. The first auxiliary information and the second auxiliary information are used for the recording of main information on the optical disc 101 or the reproduction of main information therefrom.

The first auxiliary information contains a reference clock signal which is used for the control of rotation of the optical disc 101. The second auxiliary information contains address information (LPP address information) from which the position of an arbitrary point on the optical disc 101 can be detected. The second auxiliary information also contains management information for the signal recording on the optical disc 101.

During the recording of main information on the optical disc 101 or the reproduction of main information therefrom, the track is scanned by the light beam 108 while the optical disc 101 is rotated. In this case, the wobble of the groove (or the grooves) 102 and the pre-pits 104 in the land (or the lands) 103 are detected. A wobble signal is generated in response to the detection of the wobble of the groove (or the grooves) 102. The reference clock signal is reproduced from the wobble signal. Rotation of the optical disc 101 is controlled in response to the reproduced reference clock signal. LPP signals, that is, land pre-pit signals, are generated in response to the detection of the pre-pits 104. The position of a currently-accessed point on the optical disc 101 is detected from the LPP signals. Management information for the signal recording on the optical disc 101 can be derived from the LPP signals.

The light beam 108 is focused into a light spot SP on the optical disc 101. A tracking process forces the center of the light spot SP to move along a substantial central line of the groove 102 during the rotation of the optical disc 101. The light spot SP extends over the groove 102 of interest and also the lands 103 adjoining the groove 102 of the interest. The light beam 108 is reflected by the optical disc 101, traveling back as a reflected light beam. The reflected light beam is sensed by a photodetector. The photodetector has segments separated by a line parallel to the direction of rotation of the optical disc 101. According to a radial push-pull method using the photodetector, the second auxiliary information represented by the pre-pits 104 is reproduced from portions of the reflected light beam which correspond to the light-spot portions extending over the lands 103. At the same time, the first auxiliary information represented by the wobble of the groove 102 is reproduced from a portion of the reflected light beam which corresponds to the light-spot portion extending over the groove 102. The reference clock signal is detected from the first auxiliary information. The reference clock signal is used for the control of rotation of the optical disc 101.

FIG. 11 shows the arrangement of fields ID0, ID1, ID2, and IDn+1 in the lead-in area and the data area of an optical disc (for example, a DVD-RW). As shown in FIG. 11, a set of fields ID 1, ID2, . . . , and IDn+1 is recurrently placed in specified portions of the lead-in area between a lead-in start position and a lead-in end position (a lead-in start ECC block address "FFDD05h" and a lead-in end ECC block address "FFD000h"). Specifically, a set of fields ID1, ID2, . . . , and IDn+1 is recurrently placed in a first lead-in area portion between the lead-in start position and a position immediately preceding a readable emboss start position, and a second lead-in area portion between a position immediately following a readable emboss end position and the lead-in end position.

With reference to FIG. 11, fields ID0 are placed in the data area which starts from a data start position immediately following the lead-in end position and having an ECC block address "FFCFFFh".

As previously mentioned, each field ID0 duplicately stores an information piece representative of the address of a corresponding ECC block. For an optical disc designed to be scanned at only the normal linear velocity, a set of fields ID1, ID2, . . . , and ID5 is recurrently placed in the lead-in area. As the total number of different linear velocities from which the scanning velocity of an optical disc can be selected increases, the total number of fields ID1, ID2, . . . placed-in the lead-in area increases. Therefore, as the total number of different linear velocities from which the scanning velocity of an optical disc can be selected increases, the number of the recurrence of a set of fields ID1, ID2, . . . placed in the lead-in area decreases. All fields ID1, ID2, corresponding to different linear velocities from which the scanning velocity of an optical disc can be selected are placed in the lead-in area. Accordingly, the lead-in area can be used without waste. Furthermore, at each of the different linear velocities relating to the scanning of the disc, corresponding fields ID1, ID2, can be quickly accessed.

As shown in FIG. 11, a field ID1 is placed at the lead-in start position, and fields ID2, ID3, are successively placed at positions following the lead-in start position. A set of fields ID1, ID2, . . . , and IDn+1 is recurrently placed in the lead-in area. In the case where a portion of the lead-in area between the position of a last field (a provisional last field) IDn+1 and the lead-in end position is insufficient to store a complete set of fields ID1, ID2, . . . , and IDn+1, that potion of the lead-in area is loaded with fields ID0. As previously mentioned, each field ID0 duplicately stores an information piece representative of the address of a corresponding ECC block.

In some cases, the recording and reproduction of a signal on and from the data area of an optical disc are on a real-time basis. To reliably implement the signal recording and the signal reproduction, it is desirable to surely read addresses represented by LPPs on the disc. For this reason, the data area is loaded with fields ID0, each of which duplicately has an information piece of a corresponding LPP address (a corresponding ECC block address). Regarding the start of the recording of a signal on the data area, it is desirable to surely read the addresses of several ECC blocks in a portion of the lead-in area which extends adjacently inward of the lead-in end position. As previously mentioned, in the case where a portion of the lead-in area between the position of a last field (a provisional last field) IDn+1 and the lead-in end position is insufficient to store a complete set of fields ID1, ID2, . . . , and IDn+1, that potion of the lead-in area is loaded with fields ID0. This design makes it possible to surely read the addresses of several ECC blocks in a portion of the lead-in area which extends adjacently inward of the lead-in end position since each field ID0 duplicately has an information piece of a corresponding LPP address (a corresponding ECC block address).

The lead-in area of a DVD-RW includes a readable emboss area from which LPP information is absent. Fields ID1, ID2, . . . , and IDn+1 are also absent from the readable emboss area. In the case where a portion of the lead-in area between the position of a last field (a provisional last field) IDn+1 and the readable emboss start position is insufficient to store a complete set of fields ID1, ID2, . . . , and IDn+1, that potion of the lead-in area is preferably loaded with fields ID0. According to this design, it is possible to surely confirm or detect the readable emboss start position. Preferably, a portion of the lead-in area which extends adjacently outward of the readable emboss end position, and which has a size corresponding to several tracks or several ECC blocks is loaded with fields ID0. This design makes it possible to surely confirm or detect the readable emboss end position.

A DVD-R having a lead-in area with a readable emboss area is similar to the DVD-RW in arrangement of fields ID0, ID1, ID2, . . . , and IDn+1. In a DVD-R including an LPP-added pre-recorded area instead of a readable emboss area, a set of fields ID1, ID2, . . . , and IDn+1 is recurrently placed over the whole of the lead-in area containing the LPP-added pre-recorded area.

Figure 12:
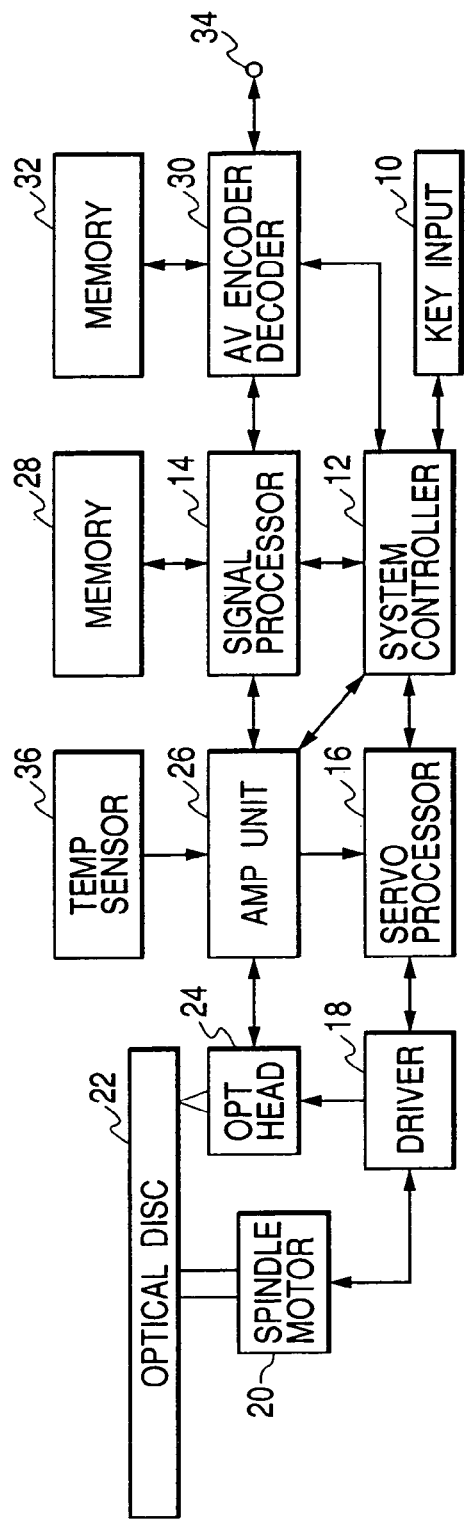
FIG. 12 is a block diagram of an information-signal recording and reproducing apparatus in the first embodiment of this invention.

FIG. 12 shows an information-signal recording and reproducing apparatus which operates on an optical disc 22 such as a DVD-RW or a DVD-R. The apparatus of FIG. 12 records and reproduces information (a signal) on and from the optical disc 22 while laser scanning the optical disc 22 by a laser beam at a constant linear velocity selectable from the normal linear velocity and at least one higher linear velocity equal to an integer multiple of the normal linear velocity. The apparatus of FIG. 12 includes a key input unit 10, a system controller 12, a signal processor 14, a servo processor 16, a driver 18, a spindle motor 20, an optical head (optical pickup) 24, an amplifier unit 26, a memory 28, an audio-video encoding and decoding unit 30, a memory 32, an input/output terminal 34, and a temperature sensor 36.

The temperature sensor 36 is located near the optical disc 22 placed in position within the apparatus. The temperature sensor 36 detects an ambient temperature of the optical disc 22. The temperature sensor 36 is connected to the amplifier unit 26.

The spindle motor 20 acts to rotate the optical disc 22. While the spindle motor 20 rotates the optical disc 22, the optical head 24 writes and reads information (a signal) thereon and therefrom. The spindle motor 20 is driven and controlled by the driver 18. The spindle motor 20 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 18.

The optical head 24 faces the optical disc 22 placed in position within the apparatus. A feed motor (not shown) moves the optical head 24 radially with respect to the optical disc 22. The feed motor is driven by the driver 18. The optical head 24 includes a semiconductor laser, a collimator lens, and an objective lens. The semiconductor laser acts as a source for emitting a light beam (a laser beam). The emitted laser beam is focused into a laser spot on the optical disc 22 by the collimator lens and the objective lens. The optical head 24 includes a 2-axis actuator for moving the objective lens to implement focusing and tracking of the laser spot with respect to a track on the optical disc 22. The semiconductor laser is driven by a laser drive circuit in the amplifier unit 26. The 2-axis actuator is driven by the driver 18.

The key input unit 10 includes a plurality of keys which can be operated by a user. The key input unit 10 generates command signals in accordance with its operation by the user. The command signals are transmitted from the key input unit 10 to the system controller 12. The command signals include a command signal for starting a recording mode of operation of the apparatus, and a command signal for starting a playback mode of operation of the apparatus. The key input unit 10 generates control data in accordance with its operation by the user. The control data are sent from the key input unit 10 to the system controller 12.

The system controller 12 includes, for example, a microcomputer or a similar device which operates in accordance with a control program stored in its internal memory. The control program is designed to enable the system controller 12 to implement operation steps mentioned later. The system controller 12 controls the signal processor 14, the servo processor 16, the amplifier unit 26, and the audio-video encoding and decoding unit 30 in response to the command signals fed from the key input unit 10.

Control data can be fed to the system controller 12 via an input terminal (not shown). The control data fed to the system controller 12 via the input terminal, and the control data fed to the system controller 12 from the key input unit 10 include a signal for adjusting the resolution of pictures represented by contents information to be recorded, a signal for separating quickly-moving scenes such as car racing scenes represented by contents information, and a signal for giving priority to a recording time. The system controller 12 changes an actual recording time in accordance with the control data. The system controller 12 enables the setting of the actual recording time to be selected by the user.

When the apparatus is required to start operating in the playback mode, the key input unit 10 is actuated to generate the playback start command signal. The playback start command signal is sent from the key input unit 10 to the system controller 12. The system controller 12 controls the servo processor 16 and the amplifier unit 26 in response to the playback start command signal, thereby starting the playback mode of operation of the apparatus. The control of the servo processor 16 includes steps of controlling the driver 18. Firstly, the system controller 12 starts rotation of the optical disc 22 and application of a laser spot thereon through the control of the driver 18. The optical head 24 is controlled by the driver 18, thereby reading out address information (LPP address information) from the optical disc 22. The readout address information is transmitted from the optical head 24 to the system controller 12 via the amplifier unit 26. The system controller 12 finds or decides a target sector (a target track portion) to be played back by referring to the address information. The system controller 12 controls the optical head 24 via the servo processor 16, the driver 18, and the feed motor, thereby moving the optical head 24 radially with respect to the optical disc 22 and hence moving the laser spot to the target sector on the optical disc 22. When the movement of the laser spot to the target sector is completed, the system controller 12 operates to start the reproduction of a signal from the target sector on the optical disc 22. In this way, the playback mode of operation of the apparatus is started. During the playback mode of operation of the apparatus, the target sector is repetitively changed from one to another.

During the playback mode of operation of the apparatus, the optical head 24 scans the optical disc 22 and generates a reproduced RF signal containing information read out therefrom. The optical head 24 outputs the RF signal to the amplifier unit 26. The amplifier unit 26 enlarges the RF signal from the optical head 24. The amplifier unit 26 generates a main reproduced signal from the enlarged RF signal. In addition, the amplifier unit 26 generates a servo error signal (tracking and focusing servo error signals) from the output signal of the optical head 24. The amplifier unit 26 includes an equalizer for optimizing the frequency aspect of the main reproduced signal. Also, the amplifier unit 26 includes a PLL (phase locked loop) circuit for extracting a bit clock signal from the equalized main reproduced signal, and for generating a speed servo signal from the equalized main reproduced signal. Furthermore, the amplifier unit 26 includes a jitter generator for comparing the time bases of the bit clock signal and the equalized main reproduced signal, and for detecting jitter components from the results of the time-base comparison. A signal of the detected jitter components is sent from the amplifier unit 26 to the system controller 12. The tracking and focusing servo signals and the speed servo signal are sent from the amplifier unit 26 to the servo processor 16. The equalized main reproduced signal is transmitted from the amplifier unit 26 to the signal processor 14.

The servo processor 16 receives the speed servo signal and the tracking and focusing servo signals from the amplifier unit 26. The servo processor 16 receives the rotation servo signals from the spindle motor 20 via the driver 18. In response to these servo signals, the servo processor 16 implements corresponding servo control procedures.

Specifically, the servo processor 16 generates a rotation control signal on the basis of the speed servo signal and the rotation servo signals. The rotation control signal is sent from the servo processor 16 to the spindle motor 20 via the driver 18. The spindle motor 20 rotates at a speed depending on the rotation control signal. The rotation control signal is designed to rotate the optical disc 22 at a speed corresponding to a selected constant linear velocity or a given constant linear velocity relating to the scanning of the optical disc 22.

In addition, the servo processor 16 generates servo control signals on the basis of the focusing and tracking servo signals. The servo control signals are sent from the servo processor 16 to the 2-axis actuator in the optical head 22 via the driver 18. The 2-axis actuator controls the laser spot on the optical disc 22 in response to the servo control signals, and thereby implements focusing and tracking of the laser spot with respect to a track on the optical disc 22.

During the playback mode of operation of the apparatus, the signal processor 14 receives the main reproduced signal from the amplifier unit 26. The signal processor 14 is controlled by the system controller 12, thereby converting the main reproduced signal into a corresponding reproduced digital signal. The signal processor 14 detects a sync signal from the reproduced digital signal. The signal processor 14 decodes an 8-16 modulation-resultant signal of the reproduced digital signal into NRZ data, that is, non-return-to-zero data. The signal processor 14 subjects the NRZ data to error correction for every correction block (every ECC block), thereby generating a sector address signal and first and second information signals. The sector address signal represents the address of a currently-accessed sector on the optical disc 22. The sync signal and the sector address signal are fed from the signal processor 14 to the system controller 12.

During the playback mode of operation of the apparatus, the signal processor 14 temporarily stores the first and second information signals in the memory 28. Thus, the signal processor 14 writes the first and second information signals into the memory 28, and reads the first and second information signals therefrom. Writing and reading the first and second information signals into and from the memory 28 are controlled to absorb a time-domain change in the transfer rates of the first and second information signals. The memory 28 includes, for example, a D-RAM having a capacity of 4 Mbytes or 64 Mbytes. The signal processor 14 outputs the readout signal (the first and second information signals read out from the memory 28) to the audio-video encoding and decoding unit 30.

In the case where the first and second information signals fed from the memory 28 via the signal processor 14 are compressed data (for example, MPEG2 data) in which audio data and video data are multiplexed, the audio-video encoding and decoding unit 30 separates the first and second information signals into compressed audio data and compressed video data. The audio-video encoding and decoding unit 30 expands and decodes the compressed audio data into non-compressed audio data. In addition, the audio-vide encoding and decoding unit 30 expands and decodes the compressed video data into non-compressed video data. During the expansively decoding process, the audio-video encoding and decoding unit 30 temporarily stores signals and data in the memory 32. The memory 32 includes, for example, a D-RAM having a capacity of 4 Mbytes or 64 Mbytes. The audio-video encoding and decoding unit 30 converts the non-compressed audio data into a corresponding analog audio signal through digital-to-analog conversion. Also, the audio-video encoding and decoding unit 30 converts the non-compressed video data into a corresponding analog video signal through digital-to-analog conversion. The audio-video encoding and decoding unit 30 applies the analog audio signal and the analog video signal to the input/output terminal 34. The analog audio signal and the analog video signal are transmitted to an external via the input/output terminal 34.

When the apparatus is required to start operating in the recording mode, the key input unit 10 is actuated to generate the recording start command signal. The recording start command signal is transmitted from the key input unit 10 to the system controller 12. The system controller 12 controls the servo processor 16 and the amplifier unit 26 in response to the recording start command signal, thereby starting the recording mode of operation of the apparatus. The control of the servo processor 16 includes steps of controlling the driver 18. Firstly, the system controller 12 starts rotation of the optical disc 22 and application of a laser spot thereon through the control of the driver 18. The optical head 24 is controlled by the driver 18, thereby reading out address information (LPP address information) from the optical disc 22. The readout address information is sent from the optical head 24 to the system controller 12 via the amplifier unit 26. The system controller 12 finds or decides a target sector (a target track portion), on which a signal is to be recorded, by referring to the address information. The system controller 12 controls the optical head 24 via the servo processor 16 and the driver 18, thereby moving the laser spot to the target sector on the optical disc 22. During the recording mode of operation of the apparatus, the target sector is repetitively changed from one to another.

During the recording mode of operation of the apparatus, an audio signal and a video signal to be recorded are fed via the input/output terminal 34 to the audio-video encoding and decoding unit 30. The audio-video encoding and decoding unit 30 converts the audio signal into corresponding audio data through analog-to-digital conversion. In addition, the audio-video encoding and decoding unit 30 converts the video signal into corresponding video data through analog-to-digital conversion. The audio-video encoding and decoding unit 30 compressively encodes the audio data and the video data into compressed audio data and compressed video data (for example, MPEG2 audio data and MPEG2 video data). The audio-video encoding and decoding unit 30 multiplexes the compressed audio data and the compressed video data to form multiplexed contents data. The audio-video encoding and decoding unit 30 outputs the multiplexed contents data to the signal processor 14. During the compressively encoding process, the audio-video encoding and decoding unit 30 temporarily stores data in the memory 32.

During the recording mode of operation of the apparatus, the signal processor 14 adds error correction code signals (ECC signals or PI and PO signals) to the multiplexed contents data. The signal processor 12 subjects the ECC-added data to NRZ and 8-16 modulation encoding procedures. The signal processor 14 adds a sync signal to the encoding-resultant contents data to form sync-added contents data. The sync signal is fed from the system controller 12. The sync-added contents data are temporarily stored in the memory 28. The sync-added contents data are read out from the memory 28 at a data rate corresponding to a data rate of the signal recording on the optical disc 22. The signal processor 14 subjects the readout contents data to given modulation for record. The signal processor 14 outputs the modulation-resultant signal to the amplifier unit 26. The output signal of the signal processor 14 is an 8-16 modulation-resultant signal. The amplifier unit 26 corrects the waveform of the output signal of the signal processor 14. The amplifier unit 26 generates a laser drive signal in response to the waveform-correction-resultant signal. The amplifier unit 26 outputs the laser drive signal to the optical head 24. The optical head 24 records the output signal of the amplifier unit 26 on the target sector (the target track portion) on the optical disc 22.

Figure 13:
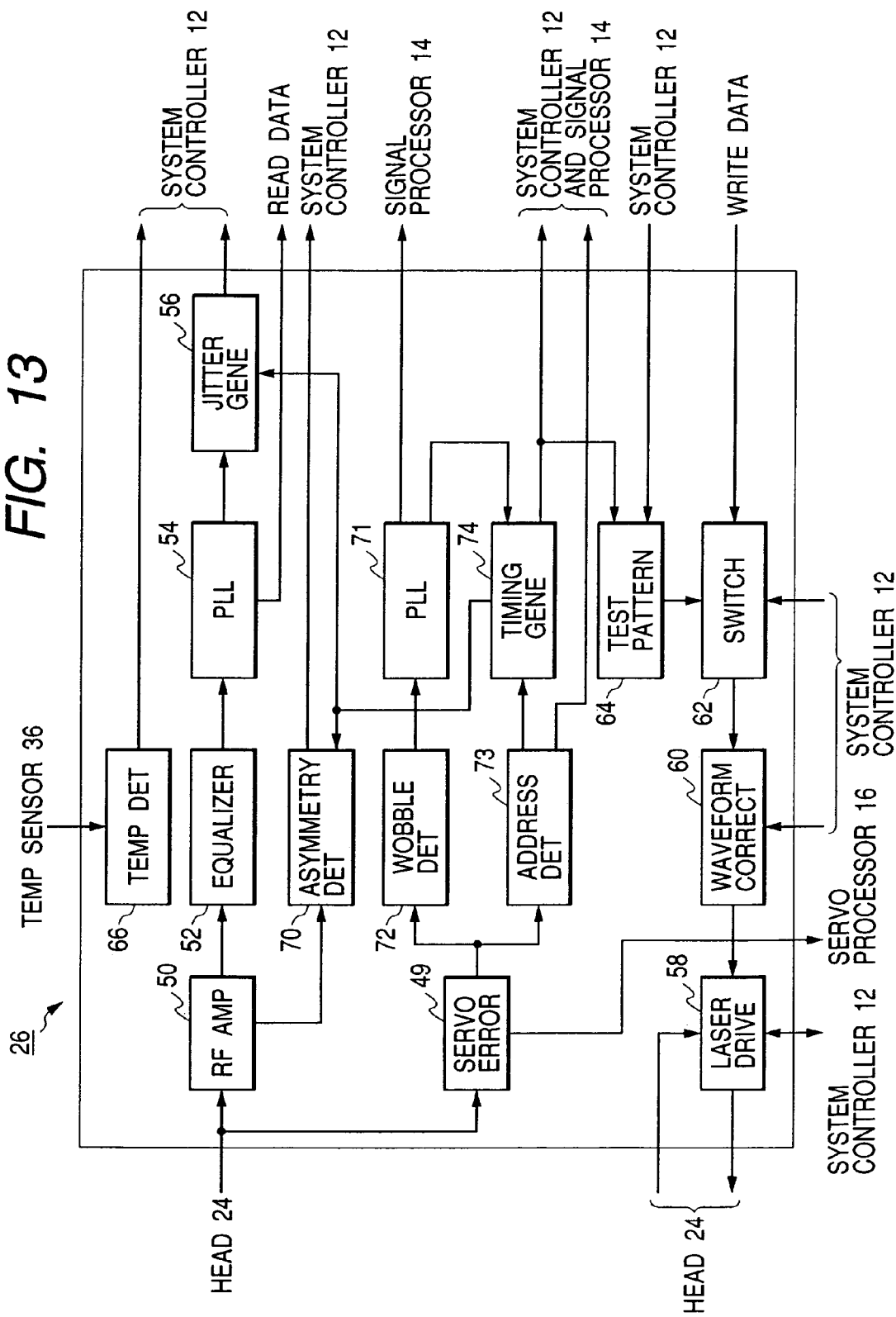
FIG. 13 is a block diagram of an amplifier unit in FIG. 12.

As shown in FIG. 13, the amplifier unit 26 includes a servo error signal generation circuit 49, an RF amplifier 50, an equalizer 52, a PLL circuit 54, a jitter signal generation circuit 56, a laser drive circuit 58, a waveform correction circuit 60, a switch 62, a test pattern generation circuit 64, a temperature detection circuit 66, an asymmetry detection circuit 70, a PLL circuit 71, a wobble detection circuit 72, an address detection circuit 73, and a timing signal generation circuit 74.

The temperature detection circuit 66 in the amplifier unit 26 is connected to the temperature sensor 36 and the system controller 12 (see FIG. 12). The temperature detection circuit 66 is an interface between the temperature sensor 36 and the system controller 12. A signal representative of the ambient temperature of the optical disc 22 is transmitted from the temperature sensor 36 to the system controller 12 via the temperature detection circuit 66.

The amplifier unit 26 operates as follows. The servo error signal generation circuit 49 and the RF amplifier 50 in the amplifier unit 26 receive the output signal of the optical head 24. The servo error signal generation circuit 49 produces a servo error signal from the output signal of the optical head 24. The servo error signal generation circuit 49 outputs the servo error signal to the servo processor 16. During the playback mode of operation of the apparatus, the RF amplifier 50 enlarges the output signal of the optical head 24. The RF amplifier 50 outputs the enlarged signal to the equalizer 52 and the asymmetry detection circuit 70. The equalizer 52 optimizes the frequency aspect of the enlarged signal. The equalizer 52 outputs the resultant signal to the PLL circuit 54. The PLL circuit 54 subjects the output signal of the equalizer 52 to PLL control, thereby generating reproduced data (read data), a bit clock signal, and a speed servo signal (a signal representing the rotational speed of the optical disc 22). The PLL circuit 54 outputs the reproduced data (the read data) to the jitter signal generation circuit 56 and the signal processor 14. The PLL circuit 54 outputs the bit clock signal to the jitter signal generation circuit 56. The PLL circuit 54 outputs the speed servo signal to the servo processor 16. The jitter signal generation circuit 56 compares the time bases of the reproduced data and the bit clock signal, thereby detecting jitter components and generating a signal of the detected jitter components. The jitter signal generation circuit 56 outputs the signal of the jitter components to the system controller 12. The timing of the jitter detection by the jitter signal generation circuit 56 is controlled by the timing signal generation circuit 74.

The output signal of the RF amplifier 50 contains a reproduced 8-16 modulation-resultant signal during the playback mode of operation of the apparatus. The asymmetry detection circuit 70 decides, from the output signal of the RF amplifier 50, the position of the center of a shortest-period signal "3T" relative to the peak and bottom amplitude positions of a longest-period signal "11T" of the reproduced 8-16 modulation-resultant signal. The asymmetry detection circuit 70 informs the system controller 12 of the decision result as a detected asymmetry value. The decision by the asymmetry detection circuit 70 corresponds to the detection of an asymmetry. The timing of the asymmetry detection by the asymmetry detection circuit 70 is controlled by the timing signal generation circuit 74. The wobble detection circuit 72 generates a wobble signal (a frequency signal) from an output signal of the servo error signal generation circuit 49. When the optical disc 22 is scanned at the normal linear velocity (3.49 m/s), the wobble signal has a frequency of about 140 kHz. The wobble detection circuit 72 outputs the wobble signal to the PLL circuit 71 as a signal frequency-multiplied by a recording clock signal having a frequency of about 26.16

MHz. The PLL circuit 71 generates a spindle speed signal and a recording clock signal in response to the wobble signal. The PLL circuit 71 outputs the spindle speed signal and the recording clock signal to the timing signal generation circuit 74 and the system controller 12. The address generation circuit 73 produces a signal of an LPP address on the optical disc 22 from the output signal of the servo error signal generation circuit 49. The address generation circuit 73 outputs the LPP address signal to the timing signal generation circuit 74, the system controller 12, and the signal processor 14. The timing signal generation circuit 74 produces a recording/reproduction timing signal in response to the output signals from the PLL circuit 71 and the address detection circuit 73. As previously mentioned, the recording and reproduction of information on and from one ECC block is synchronous with the LPP address signal. The timing signal generation circuit 74 counts pulses in the recording clock signal (or a reproducing clock signal) from every reference moment determined by the LPP address signal, and decides a recording/reproduction timing on the basis of the counted pulse number which corresponds to a sector to be accessed in an ECC block. The timing signal generation circuit 74 outputs the recording/reproduction timing signal to the system controller 12 and the signal processor 14. Similarly, the timing signal generation circuit 74 produces a reproduction timing signal in response to the output signals from the PLL circuit 71 and the address detection circuit 73. The timing signal generation circuit 74 outputs the reproduction timing signal to the jitter signal generation circuit 56 and the asymmetry detection circuit 70, thereby controlling the timing of the jitter detection by the jitter signal generation circuit 56 and the timing of the asymmetry detection by the asymmetry detection circuit 70.

The laser drive circuit 58 in the amplifier unit 26 generates a laser drive signal. The laser drive circuit 58 outputs the laser drive signal to the semiconductor laser within the optical head 24. The semiconductor laser emits the laser beam in response to the laser drive signal. The optical head 24 includes a photodiode exposed to a portion of the laser beam emitted by the semiconductor laser. The photodiode monitors the laser beam. The photodiode is also referred to as the monitor diode. The photodiode generates a signal representing the intensity (or the power) of the laser beam. The photodiode feeds the laser intensity signal back to the laser drive circuit 58 in the amplifier unit 26. The laser drive circuit 58 controls the laser drive signal in response to the laser intensity signal. The semiconductor laser, the photodiode, and the laser drive circuit 58 compose an APC (automatic power control) circuit for regulating the power of the laser beam at a desired level controlled by the system controller 12. The APC can be selectively enabled and disabled by the system controller 12. For example, the APC is enabled during the playback mode of operation of the apparatus, and is disabled during the recording mode of operation of the apparatus. The laser drive circuit 58 transmits the laser intensity signal to an A/D converter within the system controller 12. Thus, the intensity of the laser beam can be monitored by the system controller 12.

During the recording mode of operation of the apparatus, the timing signal generation circuit 74 produces a timing signal corresponding to a sector to be accessed. The timing signal generation circuit 74 outputs the timing signal to the test pattern generation circuit 64, the system controller 12, and the signal processor 14. The test pattern generation circuit 64 produces a signal of a test pattern in response to the output signal from the timing signal generation circuit 74 while being controlled by the system controller 12. The test pattern generation circuit 64 outputs the test pattern signal to the switch 62. The switch 62 receives the 8-16 modulation-resultant signal (the write data or the contents data to be recorded) from the signal processor 14. The switch 62 is controlled by the system controller 12, selecting one of the test pattern signal and the 8-16 modulation-resultant signal and outputting the selected signal to the waveform correction circuit 60.

The waveform correction circuit 60 converts the waveform of the output signal of the switch 62 into a recording waveform equivalent to that shown in FIG. 1. The waveform correction circuit 60 can set waveform correction parameters which determine the recording power level Po, the erasing power level Pe, and the pulse widths Ttop, Tmp, and Tcl (see FIG. 1). The waveform correction parameters may also determine the bias power level Pb (see FIG. 1). The waveform correction parameters set by the waveform correction circuit 60 can be changed by the system controller 12. Preferably, change of the waveform correction parameters is accorded with change of the linear velocity relating to the scanning of the optical disc 22. The waveform correction circuit 60 outputs the waveform-correction-resultant signal to the laser drive circuit 58.

The waveform correction circuit 60 and the switch 62 are controlled by the system controller 12 to provide a time base change in a great unit in accordance with change of the linear velocity relating to the scanning of the optical disc 22. The waveform correction parameters which determine the laser power levels Po, Pe, and Pb, and the pulse widths Ttop, Tmp, and Tcl (see FIG. 1) may be set by the waveform correction circuit 60 so as to optimize the asymmetry value (or the asymmetry value and the jitter value).

The test pattern signal generated by the test pattern generation circuit 64 has the alternation of the lowest-frequency signal (the longest-period signal) "11T" and the highest-frequency signal (the shortest-period signal) "3T" of the 8-16 modulation-resultant signal. Preferably, the test pattern signal is selected by the switch 62 for a time interval corresponding to one ECC block. Test data originating from the test pattern signal are recorded on an ECC block. The ECC block is composed of 16 successive sectors. The ECC block loaded with the test data is also referred to as the test ECC block. The lowest-frequency signal "11T" is recorded on the first sector in the test ECC block. The highest-frequency signal "3T" is recorded on the second sector in the test ECC block. Similarly, the lowest-frequency signal "11T" and the highest-frequency signal "3T" are alternately recorded on the third and later sectors in the test ECC block. Thus, eight pairs of the lowest-frequency signal "11T" and the highest-frequency signal "3T" are assigned to eight pairs of two successive sectors, respectively. During the recording of the test data, the system controller 12 changes at least one of the waveform correction parameters set by the waveform correction circuit 60 among eight different statuses assigned to the eight pairs of the lowest-frequency signal "11T" and the highest-frequency signal "3T" respectively.

During the playback mode of operation of the apparatus, the system controller 12 detects an access to the test ECC block. The timing signal generation circuit 74 produces timing pulses corresponding to the front ends of the sectors in the test ECC block respectively. The asymmetry detection circuit 70 samples and holds the output signal of the RF amplifier 50 in response to the timing pulses fed from the timing signal generation circuit 74. Specifically, the asymmetry detection circuit 70 samples and holds a peak and a bottom of the lowest-frequency signal "11T" reproduced from the first sector in the test ECC block. The asymmetry detection circuit 70 samples and holds a center level of the highest-frequency signal "3T" reproduced from the second sector in the test ECC block. Similarly, the asymmetry detection circuit 70 samples and holds peaks and bottoms of the lowest-frequency signals "11T" and center levels of the highest-frequency signals "3T" reproduced from the later sectors in the test ECC block. Thus, a peak and a bottom of the lowest-frequency signal "11T", and a center level of the highest-frequency signal "3T" are detected for each of the eight different-status pairs of the lowest-frequency signal "11T" and the highest-frequency signal "3T". The asymmetry detection circuit 70 converts the sample-and-hold results into digital data representing the detected asymmetries for the respective eight different-status pairs of the lowest-frequency signal "11T" and the highest-frequency signal "3T". The asymmetry detection circuit 70 outputs the asymmetry data to the system controller 12.

The system controller 12 processes the asymmetry data. Specifically, the system controller 12 decides best one among the detected asymmetries, and detects one among the eight different-status pairs of the lowest-frequency signal "11T" and the highest-frequency signal "3T" which corresponds to the decided best asymmetry. During a later recording mode of operation of the apparatus, the system controller 12 enables the waveform correction circuit 60 to set the waveform correction parameters in accordance with the best-asymmetry pair of the lowest-frequency signal "11T" and the highest-frequency signal "3T".

Operation of the apparatus will be further explained. When an optical disc 22 is placed in the apparatus, the optical head 24 is controlled to scan the optical disc 22 at the normal linear velocity and to reproduce information pieces from at least one complete set of fields ID1, ID2, . . . , and IDn+1 on the lead-in area of the optical disc 22. The reproduced information pieces are transmitted from the optical head 24 to the system controller 12 via the amplifier unit 26 and the signal processor 14. The system controller 12 decides a first total number of the fields ID1, ID2, . . . , and IDn+1 in response to the reproduced information pieces. The system controller 12 recovers an extension code from the reproduced information piece corresponding to the field ID1. The system controller 12 decides a second total number of the fields ID1, ID2, . . . , and IDn+1 in accordance with the recovered extension code. The system controller 12 confirms whether the first total number and the second total number are equal to each other. In the case where it is confirmed that the first total number and the second total number are equal to each other, the system controller 12 derives a recommended recording power level Po, a recommended erasing power level Pe, a recommended bias power level Pb, recommended pulse widths Ttop, Tmp, and Tcl, and a desired disc scanning velocity value (mX) from the information pieces corresponding to specified later fields among the fields ID1, ID2, . . . , and IDn+1. The specified later fields are the fields ID2 and ID5 when "n+1" is equal to "5". The specified later fields are the fields ID6 and ID7 when "n+1" is equal to "7". The specified later fields are the fields IDn and IDn+1 when "n+1" is greater than "7". For example, in the case where the optical disc 22 is designed to be scanned at a linear velocity selectable from the normal linear velocity, the 2-fold linear velocity, and the 4-fold linear velocity, the specified later fields are the fields ID8 and ID9 which are assigned to the 4-fold linear velocity. During a later recording mode of operation of the apparatus, the system controller 12 enables the waveform correction circuit 60 to set the waveform correction parameters to equalize an actual recording power level Po, an actual erasing power level Pe, an actual bias power level Pb, and actual pulse widths Ttop, Tmp, and Tcl to the recommended ones. In addition, the system controller 12 controls the spindle motor 20 via the servo processor 16 and the driver 18 so that the optical disc 22 will be scanned at a linear velocity equal to the desired disc scanning velocity value (mX).

Figure 14:
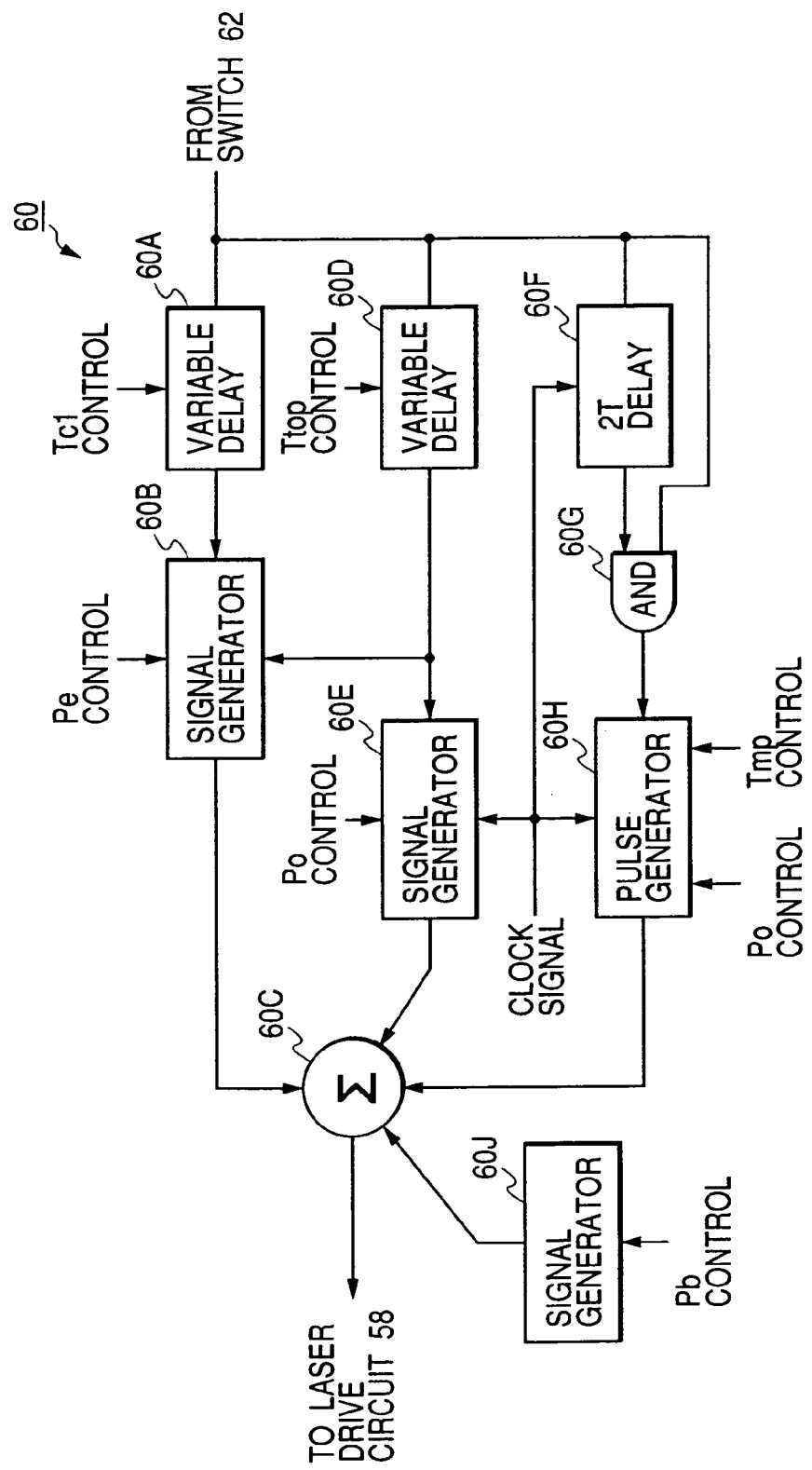
FIG. 14 is a block diagram of an example of a waveform correction circuit in FIG. 13.

FIG. 14 shows an example of the internal structure of the waveform correction circuit 60. The waveform correction circuit 60 of FIG. 14 includes a variable delay device 60A, a signal generator 60B, a summing device 60C, a variable delay device 60D, a signal generator 60E, a delay device 60F, an AND gate 60G, a pulse generator 60H, and a signal generator 60J.

The variable delay device 60A receives the output signal of the switch 62 (see FIG. 13). The variable delay device 60A defers the received signal by a time interval which corresponds to the pulse width Tcl (see FIG. 1), and which can be adjusted by the system controller 12 (see FIG. 12). The variable delay device 60A outputs the deferred signal to the signal generator 60B. In response to every falling edge in the output signal of the variable delay device 60A, the signal generator 60B produces a signal having a level which corresponds to the erasing power level Pe (see FIG. 1) minus the bias power level Pb (see FIG. 1), and which can be adjusted by the system controller 12. The signal generator 60B outputs the signal of the erasing power level Pe minus the bias power level Pb to the summing device 60C.

The variable delay device 60D receives the output signal of the switch 62. The variable delay device 60D defers the received signal by a time interval which corresponds to a 2T interval minus the pulse width Ttop (see FIG. 1), and which can be adjusted by the system controller 12. The variable delay device 60D outputs the deferred signal to the signal generators 60B and 60E. In response to every rising edge in the output signal of the variable delay device 60D, the signal generator 60B terminates the production of the signal of the erasing power level Pe minus the bias power level Pb. In response to every rising edge in the output signal of the variable delay device 60D, the signal generator 60E produces a signal having a level which corresponds to the recording power level Po (see FIG. 1) minus the bias power level Pb, and which can be adjusted by the system controller 12. The signal generator 60E outputs the signal of the recording power level Po minus the bias power level Pb to the summing device 60C. The signal generator 60E responds to a clock signal related to the output signal of the switch 62. Specifically, the signal generator 60E terminates the production of the signal of the recording power level Po minus the bias power level Pb at the end of a 1T interval provided by the clock signal.

The delay device 60F receives the output signal of the switch 62. The delay device 60F defers the received signal by a 2T interval in response to the clock signal. The delay device 60F outputs the deferred signal to a first input terminal of the AND gate 60G. A second input terminal of the AND gate 60G receives the output signal of the switch 62. The AND gate 60G executes AND operation between the output signals of the delay device 60F and the switch 62. The AND gate 60G outputs the resultant signal to the pulse generator 60H. Only when the output signal of the AND gate 60G is in its high level state, the pulse generator 60H produces a pulse signal (a pulse train signal). The pulse generator 60H responds to the clock signal so that the pulse signal produced by the pulse generator 60H will have one pulse per 1T interval, and that every falling edge in the pulse signal will coincide with the end of a 1T interval. The amplitude of the pulse signal corresponds to the recording power level Po minus the bias power level Pb, and can be adjusted by the system controller 12. The pulse width or the duty cycle of the pulse signal corresponds to the pulse width Tmp (see FIG. 1), and can be adjusted by the system controller 12. The pulse generator 60H outputs the pulse signal to the summing device 60C.

The signal generator 60J produces a signal having a level which corresponds to the bias power level Pb, and which can be adjusted by the system controller 12. The signal generator 60J outputs the signal of the bias power level Pb to the summing device 60C. The summing device 60C adds the output signals of the devices 60B, 60E, 60H, and 60J to generate a waveform-correction-resultant signal. The summing device 60C outputs the waveform-correction-resultant signal to the laser drive circuit 58 (see FIG. 13).

Second Embodiment

A second embodiment of this invention is similar to the first embodiment thereof except for design changes mentioned hereafter.

FIG. 15 shows an optical disc in the second embodiment of this invention. The optical disc in FIG. 15 includes an RMD (recording management data) area and a PC (power calibration) area. The RMD area extends inward of a disc lead-in area. The PC area extends inward of the RMD area.

An information-signal recording and reproducing apparatus in the second embodiment of this invention operates as follows. As in the first embodiment of this invention, the apparatus reproduces information pieces from at least one complete set of fields ID1, ID2, ..., and IDn+1 on the lead-in area of the optical disc. The system controller 12 in the apparatus derives a recommended recording power level Po, a recommended erasing power level Pe, a recommended bias power level Pb, recommended pulse widths Ttop, Tmp, and Tcl, and a desired disc scanning velocity value (mX) from the information pieces corresponding to specified later fields among the fields ID1, ID2, ..., and IDn+1. The system controller 12 enables the waveform correction circuit 60 to set the waveform correction parameters to equalize an actual recording power level Po, an actual erasing power level Pe, an actual bias power level Pb, and actual pulse widths Ttop, Tmp, and Tcl to the recommended ones. Then, the apparatus records the test pattern signal on the PC area or the data area of the optical disc while the system controller 12 changes at least one of the waveform correction parameters set by the waveform correction circuit 60. The apparatus reproduces the test pattern signal from the optical disc. The apparatus detects at least one of an asymmetry value, a jitter value, an error rate, and a degree of modulation from the reproduced test pattern signal. The apparatus decides an optimal recording power level Po, an optimal erasing power level Pe, an optimal bias power level Pb, and optimal pulse widths Ttop, Tmp, and Tcl on the basis of at least one of the detected asymmetry value, the detected jitter value, the detected error rate, and the detected degree of modulation. Preferably, the apparatus updates the recommended values Po, Pe, Pb, Ttop, Tmp, and Tcl into the optimal values in response to at least one of the detected asymmetry value, the detected jitter value, the detected error rate, and the detected degree of modulation. During a later recording mode of operation of the apparatus, the system controller 12 enables the waveform correction circuit 60 to set the waveform correction parameters to equalize an actual recording power level Po, an actual erasing power level Pe, an actual bias power level Pb, and actual pulse widths Ttop, Tmp, and Tcl to the optimal ones. The system controller 12 generates recording management information representative of the optimal recording power level Po, the optimal erasing power level Pe, the optimal bias power level Pb, and the optimal pulse widths Ttop, Tmp, and Tcl. The apparatus records the generated recording management information on the RMD area of the optical disc.

The RMD area of the optical disc includes a field "1" having 128 bytes. After the recording of a contents signal on the data area of the optical disc, the apparatus records 1) information representative of the conditions of the recording of the contents signal and 2) information peculiar to the apparatus on the field "1" of the RMD area. When an optical disc is placed in the apparatus, the apparatus reproduces recording condition information and peculiar information from the field "1" of the RMD area. The apparatus decides whether or not the recording condition information is valid for the apparatus on the basis of the peculiar information. In the case where the recording condition information is valid, the apparatus uses the recording condition information for a later recording mode of operation thereof. In this case, the recording mode of operation of the apparatus can be quickly started.

As shown in FIG. 16, the field "1" of the RMD area of the optical disc stores 1) an information piece representative of an apparatus identification factor such as an apparatus maker name, 2) an information piece representative of an apparatus serial number, 3) an information piece representative of an apparatus model number, 4) an information piece representative of a strategy code "1" depending on a disc scanning linear velocity and corresponding to actual recording conditions stored in a lead-in-area field, 5) an information piece representative of a recording power level, 6) an information piece representative of the execution date of the recording of a test pattern signal, 7) an information piece representative of a recording calibration position in the PCA area, 8) an information piece about running OPC (optimum power control) or an information piece representative of results and conditions for optimizing a recording power while implementing the signal recording, 9) an information piece representative of a strategy code "2" depending on a disc scanning linear velocity and corresponding to actual recording conditions stored in a lead-in-area field, 10) an information piece representative of an erasing power level depending on a disc scanning linear velocity and corresponding to actual one stored in a lead-in-area field or an information piece representative of the ratio "$\epsilon$" of the erasing power level to the recording power level, 11) an information piece being 8-bit coded data of the recording power level, 12) an information piece representative of an asymmetry value or a "$\beta$" value for deciding an optimal power at the time of recording, and 13) an information piece representative of an actually-used disc scanning linear velocity.

It should be noted that one or more of the information pieces may be omitted from the field "1" of the RMD area of the optical disc.

As previously mentioned, the information piece representative of the actually-used disc scanning linear velocity is recorded on the field "1" of the RMD area of the optical disc. Also, the information pieces representative of the recording power level, the erasing power level, and the strategy values depending on the disc scanning linear velocity are recorded on the field "1" of the RMD area of the optical disc. Furthermore, the information pieces peculiar to the apparatus are recorded on the field "1" of the RMD area of the optical disc. Accordingly, it is possible to accurately decide whether or not the recording power level, the erasing power level, and the strategy values are valid for a next recording mode of operation of the apparatus at a designated disc scanning linear velocity.

An optical disc designed to be scanned at a linear velocity selectable from the normal linear velocity, the 2-fold linear velocity, and the 4-fold linear velocity is taken as an example. Normally, the signal recording is implemented while the optical disc is scanned at the highest linear velocity, that is, the 4-fold linear velocity. Preferably, in the event that environmental conditions, temperature conditions, a rotation-caused surface bend of the optical disc, and the eccentricity of the optical disc are in predetermined undesirable ranges, the signal recording is implemented while the optical disc is scanned at the second highest linear velocity, that is, the 2-fold linear velocity, to compensate for the undesirableness. In such a case, an information piece representative of the actually-used disc scanning linear velocity (the 2-fold linear velocity) is recorded on the field "1" of the RMD area of the optical disc. Accordingly, the disc scanning linear velocity can be used for the next signal recording without making a mistake.

Information pieces representative of different disc scanning linear velocities may be recorded on different portions of the RMD area of the optical disc. In this case, it is possible to identify a disc scanning linear velocity from a portion of the RMD area on which an information piece thereof is recorded.

Third Embodiment

A third embodiment of this invention is similar to the first or second embodiment thereof except for design changes mentioned hereafter. According to the third embodiment of this invention, one lead-in-area LPP-information field, three lead-in-area LPP-information fields, or more lead-in-area LPP-information fields are added as a disc scanning linear velocity is added. Preferably, an information piece representative of a servo system gain depending on a disc scanning linear velocity, an information piece representative of the degree of modulation, and an information piece representative of a jitter value are recorded as lead-in-area LPP-information fields in addition to information pieces of a recording power level, an erasing power level, a bias power level, and strategy values.

Fourth Embodiment

A fourth embodiment of this invention is similar to one of the first to third embodiments thereof except for design changes mentioned hereafter. According to the fourth embodiment of this invention, information pieces of a recording power level, an erasing power level, a bias power level, and strategy values for the normal disc scanning linear velocity are recorded as lead-in-area LPP-information fields. On the other hand, information pieces of a recording power level, an erasing power level, a bias power level, and strategy values for each of the 2-fold or more linear velocities are previously recorded on an information management area of the optical disc which can be subjected to the recording of normal information.

The information pieces of the recording power level, the erasing power level, the bias power level, and the strategy values for each of the 2-fold or more linear velocities may be recorded as pit information on the readable emboss area of the optical disc. In the case of a write-once optical disc such as a DVD-R, these information pieces may be recorded on a pre-write basis.

Fifth Embodiment

A fifth embodiment of this invention is similar to one of the first to fourth embodiments thereof except for design changes mentioned hereafter. The fifth embodiment of this invention is designed to handle an optical disc such as a DVD+RW or a Blu-ray-standard disc. In the fifth embodiment of this invention, the optical disc may be an organic-pigment DVD-R, a DVD+R, or a Blue-system disc provided that an information piece representative of an erasing power level is omitted.

Sixth Embodiment

A sixth embodiment of this invention is similar to one of the first to fifth embodiments thereof except for design changes mentioned hereafter. The sixth embodiment of this invention uses a recording waveform which differs from that of FIG. 1 in at least one of amplitude and timing parameters.

Seventh Embodiment

A seventh embodiment of this invention is similar to one of the first to sixth embodiments thereof except for design changes mentioned hereafter. The seventh embodiment of this invention is designed to handle a magneto-optical disc, an MD, a DWDD, an ASMO, or a MAMMOS.

Advantages Provided by Embodiments

According to the first to seventh embodiments of this invention, it is unnecessary to alter the standards for an optical disc even when a higher disc scanning linear velocity is added. Furthermore, it is possible to remove or reduce a waste of recording condition information stored in an optical disc. The redundancy of the recording condition information stored in the optical disc can be effectively increased, and the recording area of the optical disc can be efficiently utilized.

Regarding an optical disc, it is possible to detect a highest linear velocity relating to the scanning of the disc. The signal recording can be implemented while an optical disc is scanned at an optimal linear velocity selected from the normal linear velocity and the higher linear velocities. In the event that environmental conditions, temperature conditions, a rotation-caused surface bend of an optical disc, and the eccentricity of the optical disc are in predetermined undesirable ranges, the signal recording is implemented while the optical disc is scanned at a linear velocity lower than the highest linear velocity to compensate for the undesirableness.

Recording condition information can easily be read out from an optical disc designed to be scanned at a linear velocity selected among the normal linear velocity and the higher linear velocities. There is no waste of the recording condition information stored in the optical disc. Accordingly, a desired portion of the recording condition information can be obtained in a short time. Since the redundancy of the recording condition information stored in the optical disc is relatively high, the recording condition information can be reliably retrieved.

What is claimed is:

1. A laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective at least three different integer multiples of a normal velocity relating to scanning of the disc, wherein each of the portions of the recording management information contains a first information piece representative of a recording strategy being a time-domain recording laser waveform for recording of information on the information recording area and a second information piece representative of a recording laser power for recording of information on the information recording area.

2. A laser-beam-scanned optical disc as recited in claim 1, comprising a DVD.

3. A laser-beam-scanned optical disc as recited in claim 1, comprising one of a DVD-R and a DVD-RW.

4. A laser-beam-scanned optical disc as recited in claim 1, comprising one of a DVD+R and a DVD+RW.

5. A laser-beam-scanned optical disc as recited in claim 1, comprising a Blue-system disc.

6. An apparatus for recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective at least three different integer multiples of a normal velocity relating to scanning of the disc, wherein each of the portions of the recording management information contains a first information piece representative of a recording strategy being a time-domain recording laser waveform for recording of information on the information recording area and a second information piece representative of a recording laser power for recording of information on the information recording area, the apparatus comprising:
- first means for reading, from the information management area of the disc, one of the portions of the recording management information which corresponds to desired one of the at least three different integer multiples of the normal velocity;
- second means for setting an actual recording strategy and an actual recording power of a laser beam in accordance with the recording strategy and the recording laser power represented by the portion of the recording management information which is read by the first means; and
- third means for recording information on the information recording area of the disc by use of the laser beam having the actual recording strategy and the actual recording power set by the second means.

7. An apparatus as recited in claim 6, wherein the disc comprises a DVD.

8. An apparatus as recited in claim 6, wherein the disc comprises one of a DVD-R and a DVD-RW.

9. An apparatus as recited in claim 6, wherein the disc comprises one of a DVD+R and a DVD+RW.

10. An apparatus as recited in claim 6, wherein the disc comprises a Blue-system disc.

11. A method of recording and reproducing information on and from a laser-beam-scanned optical disc including an information recording area and an information management area, wherein units of signal recording and signal reproduction on and from at least one of the information recording area and the information management area are blocks including first blocks each duplicately having a block address and second blocks each having both a block address and a management information piece, the information recording area storing blocks among the first blocks, the information management area storing the second blocks having recording management information including portions corresponding to respective at least three different integer multiples of a normal velocity relating to scanning of the disc, wherein each of the portions of the recording management information contains a first information piece representative of a recording strategy being a time-domain recording laser waveform for recording of information on the information recording area and a second information piece representative of a recording laser power for recording of information on the information recording area, the method comprising the steps of:
- reading, from the information management area of the disc, one of the portions of the recording management information which corresponds to desired one of the at least three different integer multiples of the normal velocity;
- setting an actual recording strategy and an actual recording power of a laser beam in accordance with the recording strategy and the recording laser power represented by the portion of the recording management information which is read; and
- recording information on the information recording area of the disc by use of the laser beam having the actual recording strategy and the actual recording power which are set.

12. A method as recited in claim 11, wherein the disc comprises a DVD.

13. A method as recited in claim 11, wherein the disc comprises one of a DVD-R and a DVD-RW.

14. A method as recited in claim 11, wherein the disc comprises one of a DVD+R and a DVD+RW.

15. A method as recited in claim 11, wherein the disc comprises a Blue-system disc.

* * * * *